United States Patent [19]
Leondires et al.

[11] Patent Number: 5,841,763
[45] Date of Patent: Nov. 24, 1998

[54] AUDIO-VIDEO CONFERENCING SYSTEM

[75] Inventors: Arthur P. Leondires, Mount Vernon; Bruce S. Allen, East Kingston; Marshall B. Garrison, Derry, all of N.H.; Philip J. Baun, Jr., Andover, Mass.

[73] Assignee: MultiLink, Inc., Andover, Mass.

[21] Appl. No.: 489,742

[22] Filed: Jun. 13, 1995

[51] Int. Cl.⁶ .......................... H04L 12/16; H04Q 11/00
[52] U.S. Cl. .............................................. 370/260; 348/15
[58] Field of Search ........................... 370/62, 259, 260; 348/14, 15; 379/201, 101; 364/514 A, 514 B, 514 C, 514 R

[56] References Cited

U.S. PATENT DOCUMENTS

| | | | |
|---|---|---|---|
| 4,295,008 | 10/1981 | Johnson et al. | 179/18 |
| 4,303,804 | 12/1981 | Johnson et al. | 179/18 |
| 4,305,149 | 12/1981 | Harrison | 370/62 |
| 4,317,007 | 2/1982 | Harrison | 179/18 |
| 4,317,960 | 3/1982 | Johnson et al. | 179/18 |
| 4,317,961 | 3/1982 | Johnson | 179/18 |
| 4,475,190 | 10/1984 | Marouf et al. | 370/62 |
| 4,686,698 | 8/1987 | Tompkins et al. | 379/53 |
| 4,710,917 | 12/1987 | Tompkins et al. | 370/62 |
| 4,716,585 | 12/1987 | Tompkins et al. | 379/202 |
| 4,796,293 | 1/1989 | Blinken et al. | 379/202 |
| 4,827,499 | 5/1989 | Warty et al. | 379/53 |
| 4,847,829 | 7/1989 | Tomplins et al. | 370/62 |
| 4,862,452 | 8/1989 | Milton et al. | 370/62 |
| 4,942,570 | 7/1990 | Kotzin et al. | 370/80 |
| 5,003,464 | 3/1991 | Edy et al. | 364/200 |
| 5,014,267 | 5/1991 | Tompkins et al. | 370/62 |
| 5,020,098 | 5/1991 | Celli | 379/202 |
| 5,046,080 | 9/1991 | Lee et al. | 379/53 |
| 5,221,250 | 6/1993 | Cheng | 494/7 |
| 5,276,678 | 1/1994 | Hendrickson et al. | 370/62 |
| 5,375,068 | 12/1994 | Palmer et al. | 364/514 |
| 5,557,538 | 9/1996 | Retter et al. | 364/514 A |

OTHER PUBLICATIONS

European Search Report issued on Apr. 25, 1994 in connection with related foreign application filed on Jan. 31, 1994, International Application No. PCT/US94/01155.

Being There (1995) New Products & Services: Videoconferencing. Lexington, Mass. *Data Communications 24(12)*:148.

Multipoint Video: Where's the Service?: Service providers often can't commit to handling a multipoint conference that isn't booked weeks or months in advance (1994) Wan Views *Data Communications 23(8)*:21.

Video Teleconferencing (1993) New Products: Videoconferencing *Data Communications 22(12)*:130.

Multimedia Networking: Restructuring the Enterprise for Video Traffic (1993) Multimedia Networks *Data Communications 22(3)*:60.

Leading Technology That Will Advance the State of Networking (1993) Features: Hot Products *Data Communications 22(1)*:36.

Video MCU Gets the Standard Treatment: Videoserver's Model 2000 MCU *Data Communications 22(1)*:50.

Mix–and–Match Videoconferencing: Startup'MCU allows videoconferences among sites using different vendors' codecs (1992) Product Leaders/WAN *Data Communications 21(11)*:73.

Now Hear This (and See it Too): Multimedia Has Arrived: Multimedia application, with their imposing bandwidth requirements, may force a major shift in the way corporate networks are built (1992) LAN Views *Data Communications 21(10)*:35.

Video MCU gets the standard treatment. (Videoserver Inc.'s 2000 multi–point control unit) (Data Transmission and Switching) (Hardware Review) (Hot Products) (Evaluation) (1993) abstract *Data Communications 22(1)*:50(2).

Mix and Match Videoconferencing:startup's MCU allows videoconferences among sites using different vendors' codecs. (multipoint control unit) (Hardware Review) (VideoServer Inc.'s Model 2000 videoconferencing equipment) (Product Leaders/WAN) (Evaluation) (1992) Abstract *Data Communications 21(11)*:73(2).

*Primary Examiner*—Douglas W. Olms
*Assistant Examiner*—Ajit Patel
*Attorney, Agent, or Firm*—Lahive & Cockfield, LLP

[57] ABSTRACT

A processor unit for a multipoint audio-video conferencing system, wherein the processor unit includes a host processor for controlling operation of the audio-video conferencing system. Controlling operation includes controlling the performance of a plurality of functions associated with servicing each of a plurality of communications connections, each of the connections being between a conferee terminal and the audio-video conferencing system. The processor unit also includes a plurality of digital signal processors, in communication with each other over a first bus and in communication with and controlled by the host processor over a second bus. Each digital signal processor includes an associated configuration element for adaptively configuring a selected digital signal processor to perform processing required by a selected one of the functions associated with servicing a selected one of the communications connections. The processing required by the conferencing functions is distributed between the plurality of digital signal processors.

62 Claims, 8 Drawing Sheets

AUDIO-VIDEO CONFERENCING SYSTEM

REFERENCE TO RELATED PATENTS/APPLICATIONS

This application is related to U.S. Pat. No. 5,495,522, filed Nov. 7, 1994, entitled "Method and Apparatus for Audio Teleconferencing a Plurality of Phone Channels," which is a continuation of U.S. patent application Ser. No. 08/012,028, filed Feb. 1, 1993, now abandoned, entitled "Methods and Apparatus for Audio Teleconferencing a Plurality of Phone Channels." The above cited patent applications, assigned to a common assignee, MultiLink, Inc., of Andover, Mass., are incorporated herein by reference.

BACKGROUND OF THE INVENTION

The invention generally relates to a system for performing audio-video telephone conferencing. More particularly, the invention is directed to methods and apparatus for distributing the signal processing requirements of an audio-video telephone conferencing system between a plurality of digital processors.

Telephone conferencing systems have been available for many years. These systems have primarily focused on providing audio conferencing. A typical conference includes a plurality of individuals who are telephonically connected into a discussion by an operator at a central locality. Such telephone conferences can be managed or unmanaged and can include a variety of features. By way of example, telephone conferencing systems typically provide audio encoding and decoding for interfacing with incoming telephone lines; voice energy level detection for determining which conferee is talking and for mixing outgoing audio; DTMF detection for detecting audio tones transmitted from tone-dialing telephones; annunciators for greeting conferees and providing instructions; subconferencing for enabling conferees to talk to and be heard by a subset of the participating conferees; and record/playback features for recording the conference and subsequently playing it back over the telephone lines for further consideration by the participants.

Conventional telephone conferencing systems typically include a control computer, sometimes referred to as an audio bridge. The audio bridge sometimes employs a host processor for providing high-level control of the telephone conferencing system. The audio bridge can further employ a plurality of digital signal processors (DSPs) for performing the processing required for the various telephone conferencing features, such as those mentioned above. Some conventional architectures employ a time division multiplexed (TDM) bus for servicing conferees. According to such an architecture, as each conferee enters the system he/she is assigned to an input/output (I/O) time slot, referred to as a channel, on a common bus. According to some systems, each DSP is permanently assigned ("nailed up") to service particular I/O channels.

Architectures which nail up particular DSPs to particular communication channels introduce significant processing inefficiencies. By way of example, if such a system is capable of servicing ten channels, but only five are being used, half of the processing power is being wasted, rather than being employed to provide more efficient service to the five channels being used. Additional inefficiencies are introduced through duplicative processing. By way of example, if the system is servicing five conferees and one DSP is associated with each conferee, then when one conferee is talking, each of the remaining four DSPs typically performs identical audio signal processing to determine how loud each conferee is talking and which conferees should be heard.

With the advent of audio-video conferencing, processing demands imposed on the multipoint conferencing systems have increased. One prior art approach to addressing these processing demands is to nail up each DSP to perform a particular conferencing function. One significant disadvantage to such an approach is that different DSPs are required for performing the decoding and encoding for conferee terminals which use different communications protocols. By way of example, if such a conferencing system is to service conferees that use a plurality of International Telephone Union (ITU) standards, such as G.711, G.722 and G.728, separate DSPs are required for each standard. Thus, the system must include enough DSPs to accommodate the maximum number of conferees for each standard that might be used. This results in considerable duplicative hardware.

Accordingly, an object of the present invention is to reduce the number of DSPs required for a conferencing system equipped to service conferees that employ a plurality of ITU standards.

Another object of the present invention is to provide an audio-video conferencing system, which more efficiently manages available processing resources.

A further object of the present invention is to provide an MCU architecture which distributes processing resources in such a way as to reduce duplicative processor hardware associated with conventional systems.

An additional object of the present invention is to provide an MCU architecture which can adaptively allocate processing resources to increase number of conferees that can be serviced.

Other objects of the invention will in part be obvious and in part appear hereinafter.

SUMMARY OF THE INVENTION

The invention is generally directed to a multipoint audio-video conferencing system. More particularly, the invention is directed to methods and apparatus for distributing the processing requirements of an audio-video conferencing system between a plurality of digital signal processors. The invention is further directed to dynamically configuring allocation of the digital signal processors.

According to one preferred embodiment, the invention comprises a processor unit for an audio-video conferencing system. The processor unit can perform a plurality of functions. By way of example, it can establish communications connections between the conferencing system and conferee terminals, which access the conferencing system by way of an external network. The processor unit can also perform various functions, with regard to each communications connection. Such functions can include frame buffering and alignment of incoming signals, audio decoding and encoding, and framing signals for transmission to conferee terminals. The processor unit can also perform functions such as, detecting which conferees are talking, which conferees are talking loudest, the average talker volume and which conferees should be heard by the other conferees. The processor unit can further provide audio and video record and play back, and annunciator messages for incoming callers. To provide the above functions, requires a significant amount of signal processing.

Accordingly, a processor unit according to the invention includes a host processor and a plurality of digital signal processors. The host processor controls operation of the conferencing system, including controlling the performance of the above discussed conferencing functions. The digital signal processors are in communication with each other over a first bus and in communication with and controlled by the host processor over a second bus. The processing required to perform the conferencing functions is distributed between the plurality of digital signal processors, each being adaptively configurable to perform the processing required by a selected one of the conferencing functions.

In a preferred embodiment, the host processor controls the configuration of the digital signal processors. By way of example, the digital signal processors can each include a digital storage element. The host processor can download software routines, to the digital storage element of a digital signal processor to configure the processor to perform the processing required by a selected one of the conferencing functions. The host processor can include a hard disk drive for storing the software routines to be downloaded to the digital signal processors.

Each of the conferencing functions has different processing requirements, some of which being more processor intensive than others. Additionally, each digital signal processor has a finite amount of processing power. Thus, each digital signal processor is capable of servicing only a particular maximum number of communications connections for each function. By way of example, if the conferencing system employs International Telephone Union (ITU) standard G.711 audio encoding, each digital signal processor that is configured to be an audio encoder can service up to 24 communications connections. In contrast, if ITU G.728 audio encoding is performed, each digital signal processor can only service up to 2 communications connections.

According to a preferred embodiment, the host processor maintains status information in memory, with regard to each digital signal processor. That status information can include: the maximum number of communications connections that the digital signal processor can service for each of the conferencing functions; the function, if any, for which each digital signal processor is configured; the number of additional communications connections that each configured digital signal processor can service.

The host processor can use the status information to determine which digital signal processor is to be assigned to perform the processing required by a particular conferencing function. By way of example, the host processor, upon recognizing that processing for a particular function is required, can examine the stored status information to determine if there is any digital signal processor, which is already configured to perform the required processing for the particular function and which can accommodate an additional communications connection. If so, the host processor assigns that processor to perform the processing for the particular function. If no such digital signal processor is available, the host can examine the stored status information to determine if there are any unconfigured digital signal processors. If so, the host processor can download software routines to configure one of the available digital signal processors to perform the required processing. If there is no unconfigured digital signal processor, the host processor can examine the stored status to determine if any digital signal processors are configured, but idle. By way of example, if a digital signal processor is configured to perform G.728 audio encoding and the stored status shows that the processor can accommodate two additional communications connections, then since a digital signal processor can perform G.728 audio encoding for a maximum of two communications connections, the host deems that processor to be idle. If the host processor locates an idle processor, it can download software to that processor to reconfigure it to perform the required processing.

In a further embodiment of the invention, the first bus, over which the digital signal processors communicate, is a time division multiplexed bus having a plurality of time slots. The host processor controls communications between the digital signal processors by assigning the time slots in which each digital signal processor transfers information. The host assigns time slots in a dynamic fashion on an as needed basis.

According to a further embodiment, the processor unit also includes network interface elements for coupling information between the first bus and the conferee terminals. As in the case of the digital signal processors, the host processor dynamically assigns the time slots to and from which each network interface element couples information.

In an alternate embodiment of the invention, the above described processor unit is included as a multipoint control unit in an audio-video conferencing system. The system further includes an operator workstation, in communication with the multipoint control unit and the conferee terminals. The operator work station includes elements for monitoring and controlling selected operational parameters associated with the audio-video communications connections.

BRIEF DESCRIPTION OF THE DRAWINGS

For a fuller understanding of the nature and objects of the present invention, reference should be made to the following detailed description and the accompanying drawings, in which.

DETAILED DESCRIPTION OF THE DRAWINGS

The invention is generally directed to a system for performing audio-video multipoint conferencing. More particularly, the invention is directed to methods and apparatus for distributing the processing requirements of an audio-video conferencing system between a plurality of digital signal processors (DSPs). The invention is further directed to dynamically adapting allocation of the DSPs to make efficient use of the available processing resources.

Figure 1:
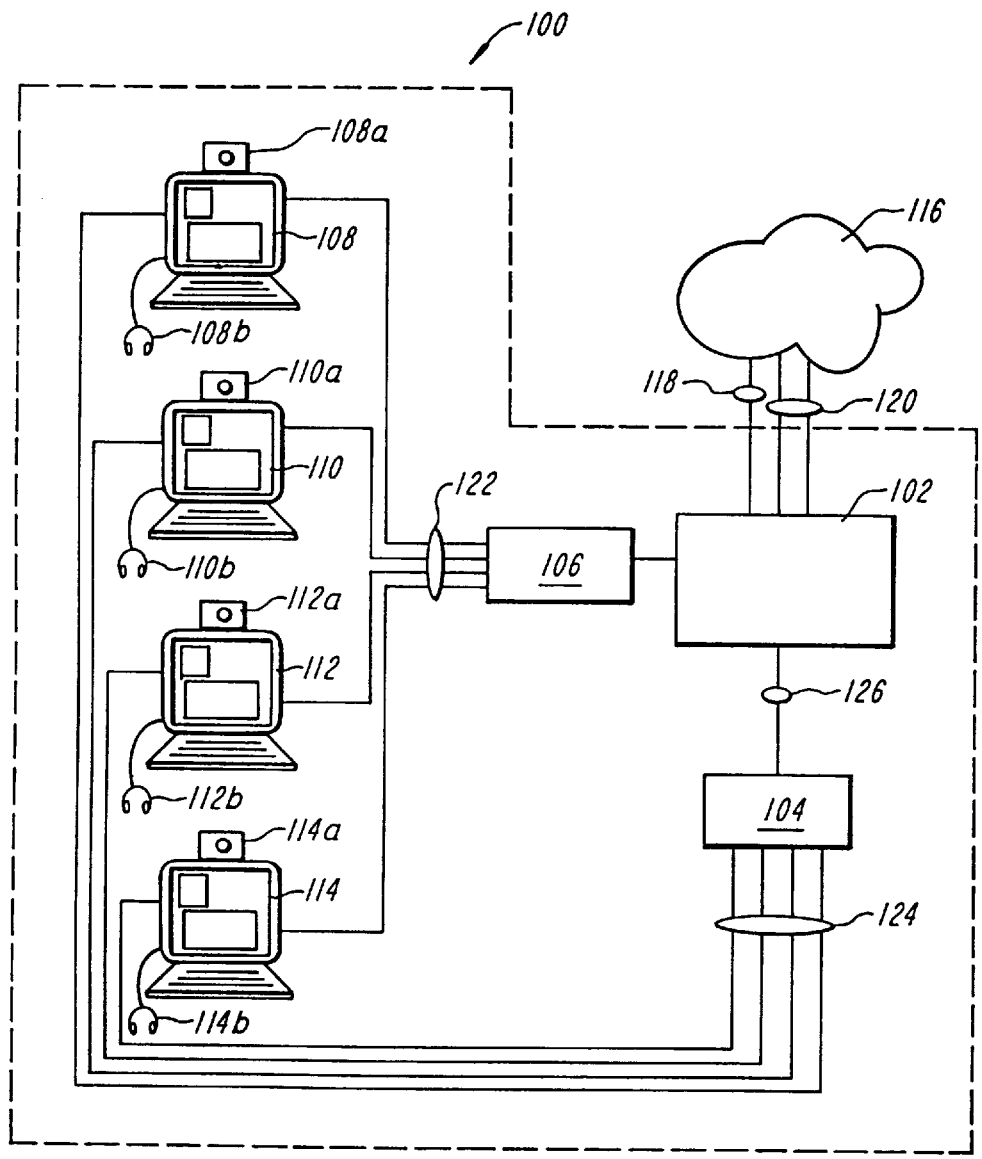
FIG. 1 is a schematic block diagram depicting the system components of an audio-video conferencing system of the type operable with the invention.

FIG. 1 shows a schematic block diagram of an audio-video multipoint conferencing system 100 of the type employed with the invention. The system 100 is preferably an International Telecommunications Union (ITU)—Telephony Standardization Sector (TSS) compliant conferencing system. The system 100 includes a Multipoint Control Unit (MCU) 102, an Integrated Services Digital Network (ISDN) multiplexer 104, a Local Area Network (LAN) Hub 106, and up to eight operator workstations 108–114.

The MCU 102 is one of the primary components of the audio-video conferencing system 100. It can connect to public or private networks 116 by way of audio 118 and video 120 T1 or ISDN Primary Rate Interface (PRI) communication links. A T1 communication link is a traditional telephone network trunk, which provides twenty-four telephone channels. ISDN is a digital telephony standard, which includes a definition for a network trunk having twenty-three data channels and one control channel. When the network interface is configured as a T1 interface, the MCU 102 can support up to eight T1 links for a total of up to 96 video channels, 192 audio channels or a mix of audio and video channels; each video channel having a maximum bandwidth of 112 Kbit/s and each audio channel having a maximum bandwidth of 64 Kbit/s. When the network interface is configured as an ISDN PRI interface, the MCU 102 can support up to 92 video and 184 audio channels; each video channel having a maximum bandwidth of 128 Kbit/s and each audio channel having a maximum bandwidth of 64 Kbit/s.

The MCU 102 digitally interfaces with the operator workstations 108–114, by way of the LAN Hub 106 and the LAN backbone 122. The operation and structure of LAN Hub 106 and the LAN backbone 122 are governed by International Organization for Standardization (ISO) standard 8802.3 10 base T. The operator workstations 108–114 enable system operators to configure and control a plurality of conferences. The operator workstations 108–114 each include an audio-video interface to enable the operators to see/hear conferees and to be seen/heard by conferees. The interface includes video cameras 108a–114a and headsets 108b–114b. The ISDN multiplexer 104 establishes the audio-video connection between the operator workstations 108–114 and the MCU 102. The multiplexer 104 supports a Basic Rate Interface (BRI) 124 on the operator workstation side of the connection and a Primary Rate Interface (PRI) 126 on the MCU side of the connection.

A multipoint audio-video conferencing system of the type depicted in FIG. 1 and able to be employed with the invention is available from the MultiLink, Inc., Andover, Mass. and marketed under the tradename System 80.

Figure 2:
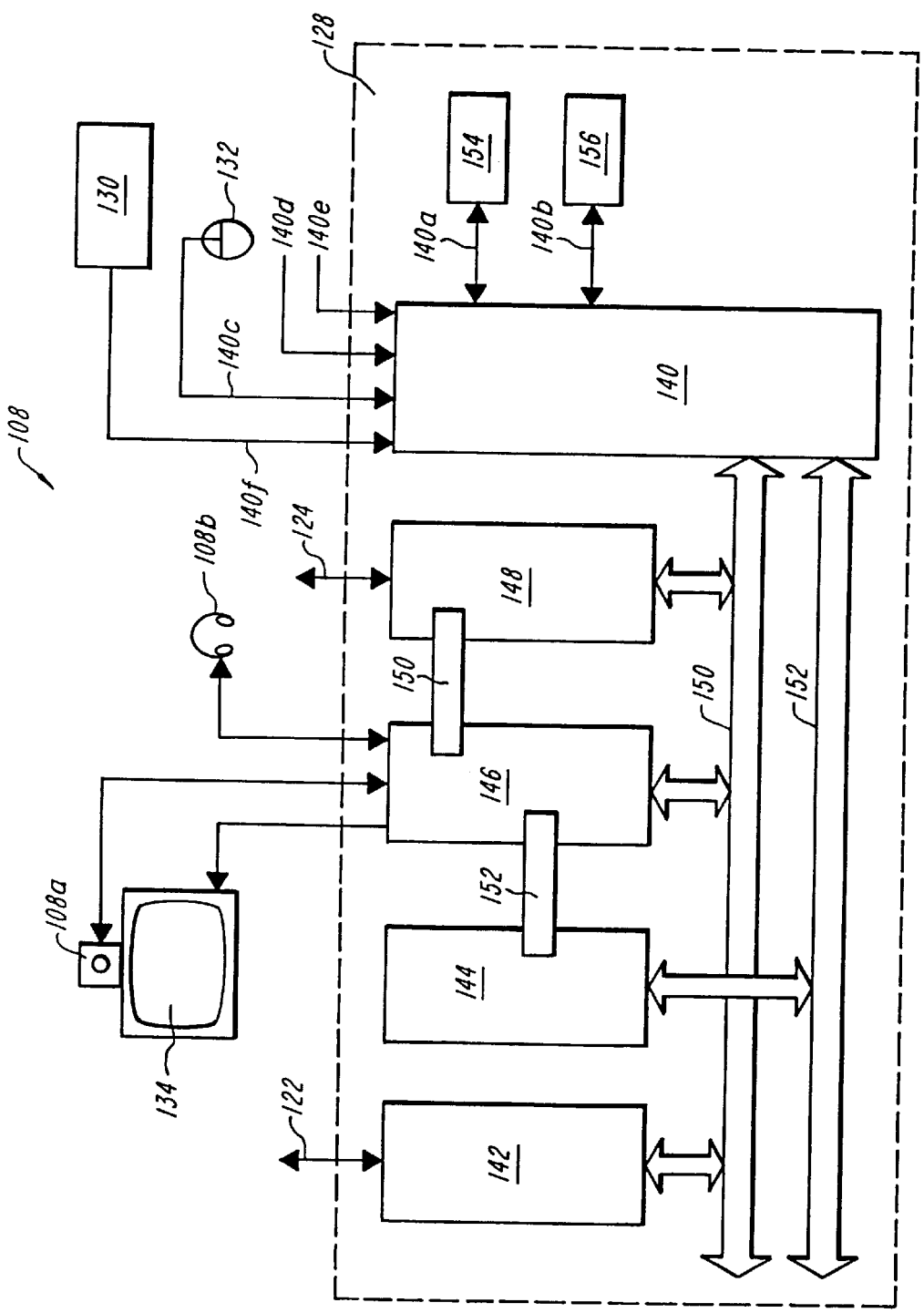
FIG. 2 is a schematic block diagram of an operator workstation of the type depicted in FIG. 1.

FIG. 2 shows a schematic block diagram of an exemplary operator workstation 108. The operator workstation 108 provides a platform for running a Windows®-based graphical user interface (GUI) which controls conferencing application programs running on the MCU 102. The operator at the workstation can setup and control conferences using a point and click GUI. The workstation 108 communicates commands to the MCU 102 by way of the LAN connection 122 and the LAN Hub 106. The operator workstation 108 can perform tasks, such as dialing up conferees, moving conferees between conferences, scheduling conferences and defining minimum terminal capabilities for conferees wishing to participate in the conference. Additionally, because the workstation 108 connects to the MCU 102 through a LAN, it need not be dedicated to one MCU. According to a preferred embodiment, an operator can log into several MCUs at once and connect to them by clicking on their open windows on the workstation screen.

The workstation 108 also supports hardware and software required to enable an operator to appear in a video conference. This includes the video camera, along with the required encoding, decoding and communications hardware. The operator can establish and connect to a video conference in the same fashion as for an audio conference, using a GUI displayed on the operator workstation screen. Once the connection is created, video from the operator's camera 108a can be encoded and then transmitted to the conference and current conference video can be transmitted to the workstation 108, both by way of ISDN multiplexer 104.

As shown in FIG. 2, the workstation 108 is an Industry Standard Architecture (ISA) standard PC/AT high-performance desktop computer, including a six principle components: the system unit 128, a keyboard 130, a pointing device (a mouse) 132, a monitor 134, a video camera 108a and an audio headset 108b.

The system unit 128 includes a chassis (not shown) for housing a system board 140, a LAN adapter board 142, a graphics adapter board 144, a video Coder/Decoder (CODEC) board 146 and a network adapter board 148, all interconnected by way of an ISA bus 150 and/or Peripheral Component Interface (PCI) bus 152. The chassis also houses a one gigabyte hard disk drive 154 and a 3½ inch floppy disk drive 156. All of the components attach to or plug into the chassis. An example of a system chassis of the type employed by workstation 108 is ML#03500166, available from Intel. It includes a mechanical chassis structure, a two hundred Watt power supply and a backplane.

Preferably, the system board 140 is Pentium processor based and runs with a 90 MHz clock. This processor is compatible with the 8086, 80286, I386 and I486 processors, all available from Intel. It supports both read and write burst mode bus cycles, and includes an on-chip 16 Kbyte cache memory, which is split into 8 Kbyte code and 8 Kbyte data caches, employing a write-back policy. The Pentium processor also integrates an advanced numeric coprocessor which significantly increases the speed of floating point operations, while maintaining compatibility with I1486 DX math coprocessors and substantially complying with ANSI/IEEE standard 754-1985.

The system board 140 includes a plurality of interfaces for integrated peripherals. By way of example, system board 140 includes an IDE hard disk drive controller interface 140a, a floppy disk controller interface 140b, serial ports 140c and 140d, parallel port 140e, and keyboard interface 140f. As shown, the COM1 port provides an interface to a standard two-button mouse 132. The keyboard 130 is a standard 101 key keyboard.

The system board 140 also has resources for supporting expansion peripherals in the form of five ISA bus connector slots and three PCI local bus connector slots on a passive backplane. One ISA and one PCI connector share a common slot which can be loaded with either type of board. Thus, the system can accommodate a maximum of seven expansion boards. Slots are numbered 1 to 7. Slot 1 is the shared ISA/PCI slot. Slots 2 and 3 are PCI slots. The remaining slots, 4, 5, 6 and 7, are ISA slots. Two adapter boards are installed in the depicted operator workstation 108: the graphics adapter board 144, which supports a minimum resolution of 1024 by 768 pixels with a palette of 256 colors; and a LAN adapter card 142, which supports a connection to the ISO 8802.3 10 Base T compliant LAN 122.

To provide video capability, the workstation 108 includes the video camera 108a, the graphics adapter board 144, the video CODEC board 146 and the network interface (NI) board 148. These components enable the workstation 108 to interface to the MCU 102 and to encode, decode, transmit and display real time video at a rate of up to thirty frames/ second. This capability allows the workstation 108 to participate in multipoint audio-video conferences; a necessary capability if the operator at the workstation 108 is to manage audio-video conferences.

The graphics adapter board 144 is installed in slot 3. The CODEC board 146 and NI board 148 are installed in slots 4 and 6, respectively. These boards are interconnected by way of two high speed busses. More specifically, data is passed between the CODEC board 146 and the NI board 148 by way of a Multi-Vendor Integration Protocol (MVIP) bus 150. MVIP is an industry standard for connecting telephony boards. It consists of a time division multiplexed (TDM) bus having 256 time slots on eight primary (DSi) conductors (rails) and 256 time slots on eight secondary (DSo) rails. Each rail supports 32 eight-bit time slots. Optionally, the MVIP 150 bus can be a high speed (H)-MVIP bus and include an additional 256 time slots on eight tertiary (DSs) rails. Graphics information is passed from the graphics adapter board 144 to the CODEC board 146 by way of the Video Electronics Standards Association (VESA) expansion bus 152. No video information travels on either the PCI 152 or ISA 150 busses.

The workstation requires a high speed serial interface to support video communications. This is in addition to the LAN interface, which is used only for data sharing and for controlling the MCU 102. Accordingly, the NI board 148 includes an ISDN BRI 124 to the ISDN multiplexer 104. The ISDN BRI 124 supports a 128 Kbit bandwidth.

The CODEC board 146 is preferably a Z200 single board CODEC, available from Zydacron. It contains hardware to encode and decode video and audio information in accordance with the ITU H.320 standard, an MVIP interface to connect to the NI board 148, and all necessary video input and output connections. The MVIP interface is implemented on a forty pin ribbon cable that connects the CODEC board 146 to the NI board 148. The MVIP interface supports eight channels in and eight channels out, of which the CODEC board 146 and the NI board 148 require only one. The VESA interface is implemented by way of a twenty-six pin cable connected between the CODEC board 146 and the graphics adapter board 144.

The CODEC board 146 also provides an interface to the monitor 134, the video camera 108*a*, and the headset 108*b*. The monitor 134 is preferably a 17" or 21" monitor, and is capable of displaying a 1024 by 768 image, with 256 colors, at a refresh rate of 75 Hz. A monitor of the type employed by the workstation 108 is a model 17G, available from ViewSonic.

The video camera 108*a*, is preferably a color camera for providing an image of the operator to conferees. The camera 136 is mounted on top of the workstation monitor 134. The camera mounting preferably allows for adjustment in both vertical and horizontal directions. A video camera of the type employed with the invention is a model IK-M27A, available from Toshiba.

The headset 108*b* supplies audio to and from the operator. In a video conference, compressed audio accompanies the video data coming in from the MCU 102. The audio is decompressed by the CODEC board 146 and supplied to the operator through the headset 108*b*. For an audio conference, the audio is supplied to the workstation 108 through the same digital connection, and is passed through the CODEC board 146 to the headset 108*b*. The headset 108*b* preferably connects to the CODEC board 146 by way of a 3.5 mm miniature stereo plug. The plug is preferably wired with the microphone on the tip and the earphone on the ring. Earphone and microphone share the common on the sleeve. The headset microphone is preferably an electret-type, with an output of −30 dB at 2 V input. The operating voltage is preferably 2 V min., 5 V max., with a supply current of 1 mA max. at 2 V. The headset earphone can be monaural or binaural and should have an impedance of at least 48 ohms. A headset of the type employed by the operator station is a model #1200 headset, with a model #3071 microphone element, available from Gentex Electro-Acoustics.

Figure 3:
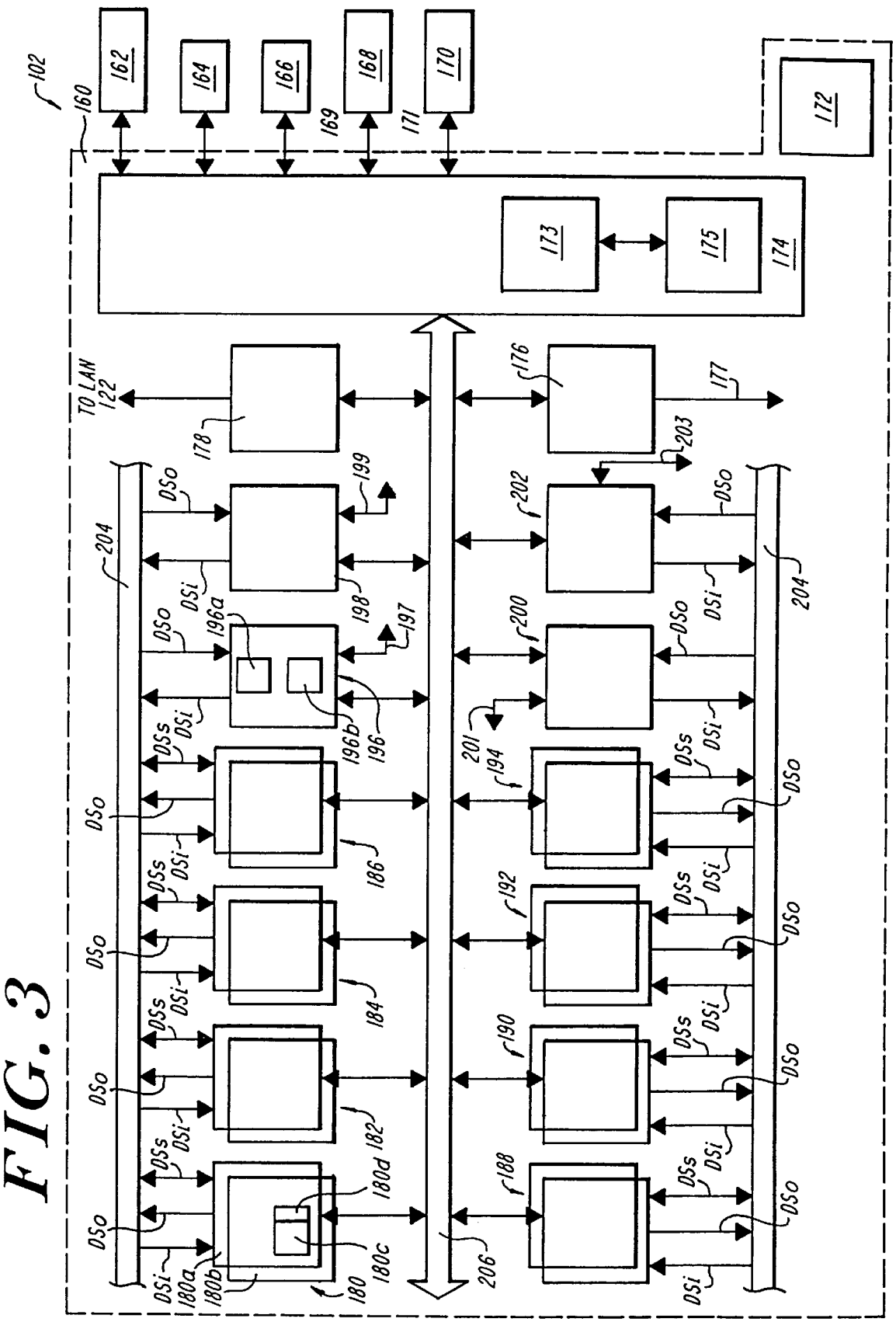
FIG. 3 is a schematic block diagram of a Multipoint Control Unit (MCU) constructed in accordance with the invention.

FIG. 3 is a schematic block diagram of an MCU 102 of the type shown in FIG. 1. In a similar fashion to the operator workstation 108, the MCU 102 is based on an ISA PC/AT backplane chassis 160. The chassis 160 can accommodate thirteen full length ISA compatible boards and two half length boards. The MCU 102 includes the chassis 160, a 3½ inch floppy disk drive 164, a two 1 Gbyte hard drives 166, a maintenance terminal 170, a 500 Watt power supply 172, a host processor board 174, a power switch and various alarm and indicator LEDs. The MCU 102 can also include a standard 101 key Keyboard 162 and a printer 168. As shown in FIG. 1, the MCU 102 connects to public or private networks by way of either T1 or ISDN links. The printer 168 can communicate with the host processor board 174 by way of a parallel interface 169. The maintenance terminal 170 communicates with the host processor board 174 over a standard RS232 channel, by way of port 171.

Of the thirteen available card slots, three are required by the system. They are the host processor board 174, which is located in slot 13; the internal modem board 176, located in slot 14; and the LAN adapter board 178, located in slot 15. The remaining twelve slots are allocated to DSP board assemblies 180–194, located in slots 5–12; and network interface (NI) boards 196–202, located in slots 1–4. The DSP board assemblies 180–194 and the NI boards 196–202 interface with each other by way of the H-MVIP bus 204 and interface with the host processor board 174 by way of the ISA Bus 206. The LAN adapter board 178 and the internal modem board 176 also interface with the host processor board 174 by way of the ISA bus 206. The LAN adapter board 178 provides an ISO standard 8802.3 10 base T interface to LAN 122. The internal modem board 176 provides a V.32 bis, V.42 bis modem interface 177 to a standard analog telephone line, with direct dial access for remote system maintenance.

The NI boards 196–202 provide, over connections 197, 199, 201 and 203, the ISDN/T1 interface between the H-MVIP bus 204 and the network 116. The NI boards 196–202 are intelligent, dual trunk boards capable of supporting either T1 or ISDN PRI interfaces. Each board supports two independent 1.544 Mbit/s trunks, by way of example, 196*a* and 196*b*, with each trunk able to operate in either T1 or ISDN formats.

As previously discussed, the H-MVIP bus 204 is a TDM bus, which contains three bus components: a primary (DSi) component; a secondary (DSo) component; and a tertiary (DSs) component. Each component provides eight physical rails, each rail having thirty-two eight-bit time slots. Thus, each bus supports 256 eight-bit time slots. Each NI board 196–202 has forty-eight digital channels. The four NI boards 196–202 combine to provide 192 T1 channels or 184 ISDN PRI channels. Each 64 Kbit/s channel from the NI cards is standardly referred to as a Digital Signal level Zero (DS0) channel. The NI boards 196–202 couple information to the DSi component of the H-MVIP bus 204. The NI boards 196–202 couple information back to the network 116 from the DSo component of the H-MVIP bus 204.

The NI configuration is software driven, i.e. the host 174 loads code and configuration information to each NI board, as required. By way of example, upon receiving a communication from the network 116 over any of the connections 197, 199, 201 and 203, the corresponding NI board interrupts the host 174. In response to the interrupt, the host 174 signals the NI board as to which time slots on the H-MVIP bus 204 to place the received information. In response to the host's commands, the NI board couples the information from the network 116 to the assigned time slots on the DSi component of the H-MVIP bus 204.

When operating in T1 format, the NI board supports twenty-four Robbed Bit Signal (RBS) channels. Framing techniques can be either D4 or Expanded Superframe (ESF), the signaling format is Ear and Mouth (E&M) and Zero Code Suppression options include Alternate Mark Inversion (AMI) or Binary Eight Zero Substitution (B8ZS). When operating in ISDN PRI format, the NI board supports twenty-three bearer (B)-channels and one data channel, framing techniques can be either D4 or ESF, and Zero Code Suppression options include AMI or B8ZS.

While the NI boards 196–202 provide the interface between the telephone network and the H-MVIP bus, the DSP board assemblies 180–194 perform the conferencing functions. Each DSP board assembly 180–194 occupies a single full length, sixteen bit ISA bus slot and contains eight Texas Instruments TMS320C31 floating point 50 MHz DSPs, referred to as nodes. Each node includes an 8 Kbyte dual port RAM dedicated to interfacing with the ISA bus 206 and an 8 Kbyte dual port RAM dedicated to interfacing with the H-MVIP bus 204. The DSP board assemblies 180–194 couple information in from the NI boards by way of the DSi component of the H-MVIP bus 204. Alternatively, they couple information out to the NI boards 196–202 by way of the DSo component of the H-MVIP bus 204. The DSP board assemblies 196–202 couple information between themselves by way of the DSs component of the H-MVIP bus 204.

Each DSP board assembly 180–194 is configured as a parent/child combination. The parent board, by way of example, board 180a contains four nodes 180c with associated dual port memories 180d and performs the H-MVIP bus interfacing, the ISA bus interfacing and child board support. The child board, by way of example, board 180b also contains four nodes, along with all of the associated hardware for interfacing with the parent board 180a.

All DSPs, on both the parent and child boards, are identically equipped with support electronics for H-MVIP bus access, communications with the host processor 174 and memory storage. Each individual node is capable of 50 MFLOPS and 25 MIPS for a total of 400 MFLOPS and 200 MIPS per assembly 180–194. Each node on each DSP board assembly 180–194 can be run independently and execute different code modules, downloaded to its respective dual port RAM from the host 174, to accommodate the demands of the conferencing system 100. Additionally, each node receives instructions from the host 174 regarding which time slots on the HMVIP bus 204 the node is to read information from and to which time slots the node is to couple processed information. The host 174 dynamically allocates time slots on an as needed basis.

The host processor board 174 is a full length ISA compatible board, which plugs directly into the passive backplane. The host processor board 174 includes an Intel Pentium 90 MHz processor 173, 32 Mbytes of RAM 175, battery backed CMOS BIOS, two RS232 serial ports (one of which being port 175), and one centronics parallel printer port 175. The host processor board 174 also includes controller interface connections 163 and 165 for floppy disk drive 164 and two 1 Gbyte hard disk drives 166, respectively.

According to a preferred embodiment, the audio-video conferencing system 100 supports ITU recommended standards. Some of the ITU standards that are supported by the system 100 of FIG. 1 are shown in Table 1.

TABLE 1

| | |
|---|---|
| H.320 | Narrow Band Visual Telephone Systems and Equipment. |
| H.221 | Frame Structure for 64–1920 Kbit/s in Audiovisual Teleservices. |
| H.230 | Frame Synchronous Control and Indication Signals for Audiovisual Systems. |
| H.231 | MCUs for Audiovisual Systems using Digital Channels up to two Mbit/s. |
| H.242 | System for Establishing Communication between Audiovisual Terminals Using Digital Channels up to two Mbit/s. |
| H.243 | Procedures for Establishing Communication between three or More Audiovisual Terminals Using Digital Channels up to two Mbit/s. |
| H.261 | Video CODEC for Audiovisual Services. |
| G.711 | Pulse Code Modulation (PCM) of Voice Frequencies. |
| G.722 | Coding of Speech at 64 Kbit/s. |
| G.728 | Coding of Speech at 16 Kbit/s Using Low-Delay Code Excited Linear Prediction (CELP). |

The H-series standards listed above describe in detail the intricacies involved in connecting to and controlling a video CODEC. The G-series standards describe the different audio coding methods currently available to ITU compliant CODECs.

In an audio-video conference, each conferee interfaces to the system 100 by way of a local terminal. The conferee's local terminal includes a CODEC. The operators, by way of workstations 108–114, have the ability to view and configure all aspects of a conference. Audio-video conferences are setup according to the CODEC capabilities of the participating conferees or according to a minimum CODEC capability determined to be in effect for the conference. The capabilities for the conference can be fixed or variable. If a conferee cannot meet the capabilities established for the conference, that conferee can attend the conference in an audio only mode, the operator can command the MCU 102 to step down the capabilities to allow the conferee to join the conference, or the MCU 102 can automatically step down capabilities.

The capability exchanges between the conferees and the system 100 are arbitrated by the MCU 102 and automatically occur as a conferee enters the system 100. Once a conferee has interfaced with the system 100, the system 100 can store the conferee's terminal capabilities for future use. By doing so, the operator can build a database of conferees, and their equipment, for aiding in subsequent conference configurations. Operators can set the conference capabilities before a conference begins. While a conference is progressing, the operator can view and modify the conference modes, for example, pertaining to audio encoding and decoding, video encoding and decoding and information transfer rate parameters. Since conference commands which initiate a conference mode switch affect all conferees, only the MCU 102, as directed by an operator, can initiate a mode switch.

According to a preferred embodiment, the system 100 provides a video image of the conferee who is talking to all other conferees having video capability. When a new conferee speaks for a predetermined configurable length of time, the MCU 102 switches the video data stream to the conferees to provide an image of the new speaker. When video switching occurs, an audio-video terminal must efficiently synchronize with the new video data stream and respond to any commands embedded in the video data. The speed of synchronization to new video data is a crucial factor for video conferences.

According to a preferred embodiment of the system 100, the video switching procedure begins with a "Freeze Picture" command, sent by the MCU 102 to all terminals in the conference, except for the new broadcasting terminal. The terminals respond by freezing the video image displayed on their screens. The MCU 102 then switches to the new video source and sends this data to all of the terminals in the conference, except for the new broadcaster, who continues to receive the video of the previous broadcaster. The receiving terminals must synchronize with the new video stream. If synchronization is not achieved quickly enough, any commands embedded in the new video data are not seen by the receiving terminals. The MCU 102 then sends a "Fast Update Request" command to the new broadcasting terminal. The new broadcasting terminal updates its video image and transmits it, encoding a "Freeze picture Release" command within the video image. If receiving terminals have not synchronized with the new video image, they cannot decode and respond to the "Freeze Picture Release" command. This results in a poor video image.

The MCU 102 alleviates the video synchronization timing issue by supporting a timing parameter "Freeze to Update Time." This parameter allows for a delay between the sending of the "Freeze Picture" command and the "Fast Update Request" command, and allows a receiving terminal enough time to synchronize with the new video data stream. Another parameter supported by the MCU 102 pertaining to video switching is the "Fast Update Commands" parameter. This parameter determines how many "Fast Update Request" commands to send to the new broadcasting terminal. In case the embedded video command "Freeze Picture Release" was not received by a terminal, that terminal is provided with another opportunity to locate this command in the video data stream.

Each type of terminal in the conference as associated with particular "Freeze to Update Time" and "Fast Update Commands" parameters. The MCU 102 stores these parameters in its database. Upon creating a conference and adding terminals to that conference, the MCU 102 determines the required values for each of these two parameters. It then sets the values for the conferee according to the terminal(s) having the highest "Freeze to Update Time" and the highest "Fast Update Commands."

According to a preferred embodiment of the system 100, to expand the available bandwidth, the video CODECs contained in the conferees' terminals can connect to the MCU 102 by way of multiple network 116 connections. Each connection consists of a bearer (B)-channel, defined as a 64 Kbit/s channel. According to ITU standards, a CODEC can connect up to thirty B-channels together to form a single connection. In the case of a 2B connection, two B-channels are connected to realize video rates of up to 128 Kbit/s. Connecting two channels is accomplished in the system 100 according to the H.221 standard.

Figure 4:
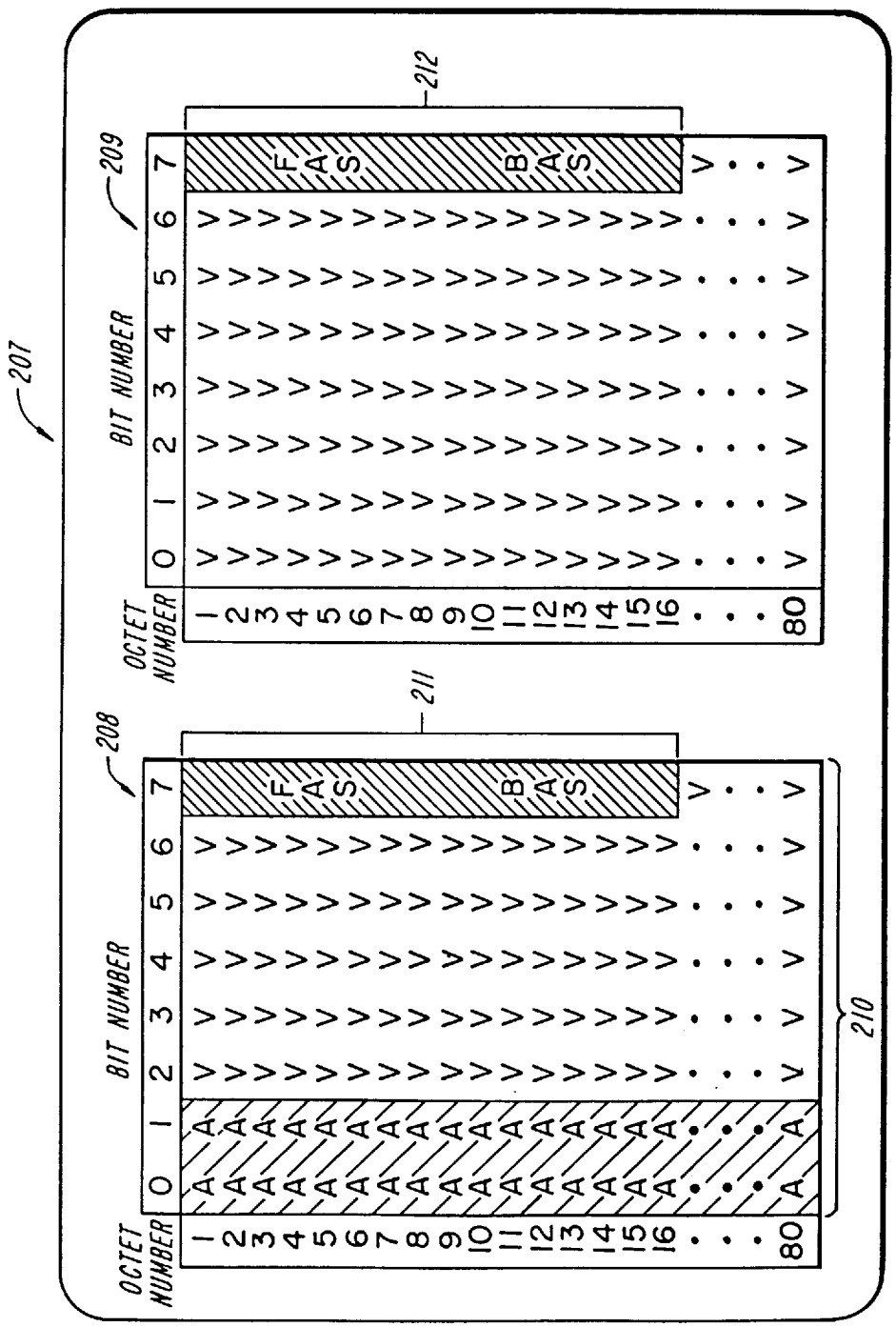
FIG. 4 depicts an ITU H.221 multichannel frame structure with G.728 audio coding.

FIG. 4 shows an H.221 connection 207 comprising an initial (I)-channel 208 and an additional (A)-channel 209, each employing G.728 audio coding on an unrestricted network. The H.221 standard defines a multiplexing scheme for combining video (V), audio (A) and control information on a B-channel. Other types of data can also be included. Under the H.221 standard, additional data is treated like video data. Each H.221 channel, for example channel 208, includes sixteen frames (only one of which is shown). Each frame contains eighty octets 210. Each octet 210 contains eight-bits. Octets are transmitted at a rate of 8000/sec. Thus, it requires 10 ms to transmit a frame and 0.16 seconds to transmit the sixteen frames, which comprise a channel. Under the G.728 standard, bits 0 and 1 of the I-channel 208 comprise the audio field. According to H.221, on an unrestricted network, bit 7 in the first sixteen frames of each channel 208 and 209 forms a service channel (SC) 211 and 212. The remaining bits can be allocated to video or data. The SC repeats every eighty octets.

All command control information is transmitted by way of the H.221 SC. The commands sent over the SC are known as a Bit Rate Allocation Signal (BAS) codes. BAS codes can be transmitted once every 20 ms. H.221 defines a plurality of capabilities and commands corresponding to the BAS codes. Also, contained on the SC is a Frame Alignment Signal (FAS). The FAS provides framing information that enables the receiving side of the connection to synchronize with the transmitting CODEC and vice versa to align the eighty octets included in each frame, the sixteen frames included in each channel, and the up to thirty channels included in each connection.

The SC occupies 1.6 Kbit/s in each channel 208 and 209 and, as discussed above, is located in the 7th bit position in an unrestricted network. An unrestricted network is one that allows the full use of the 64 Kbit/s channel. This is accomplished by utilizing a signaling technique called Common Channel Signaling (CCS). CCS is used in ISDN PRI network interfaces. Using an ISDN PRI trunk as a network interface results in a full 128 Kbit/s of usable transfer bandwidth for a 2B connection.

Figure 5:
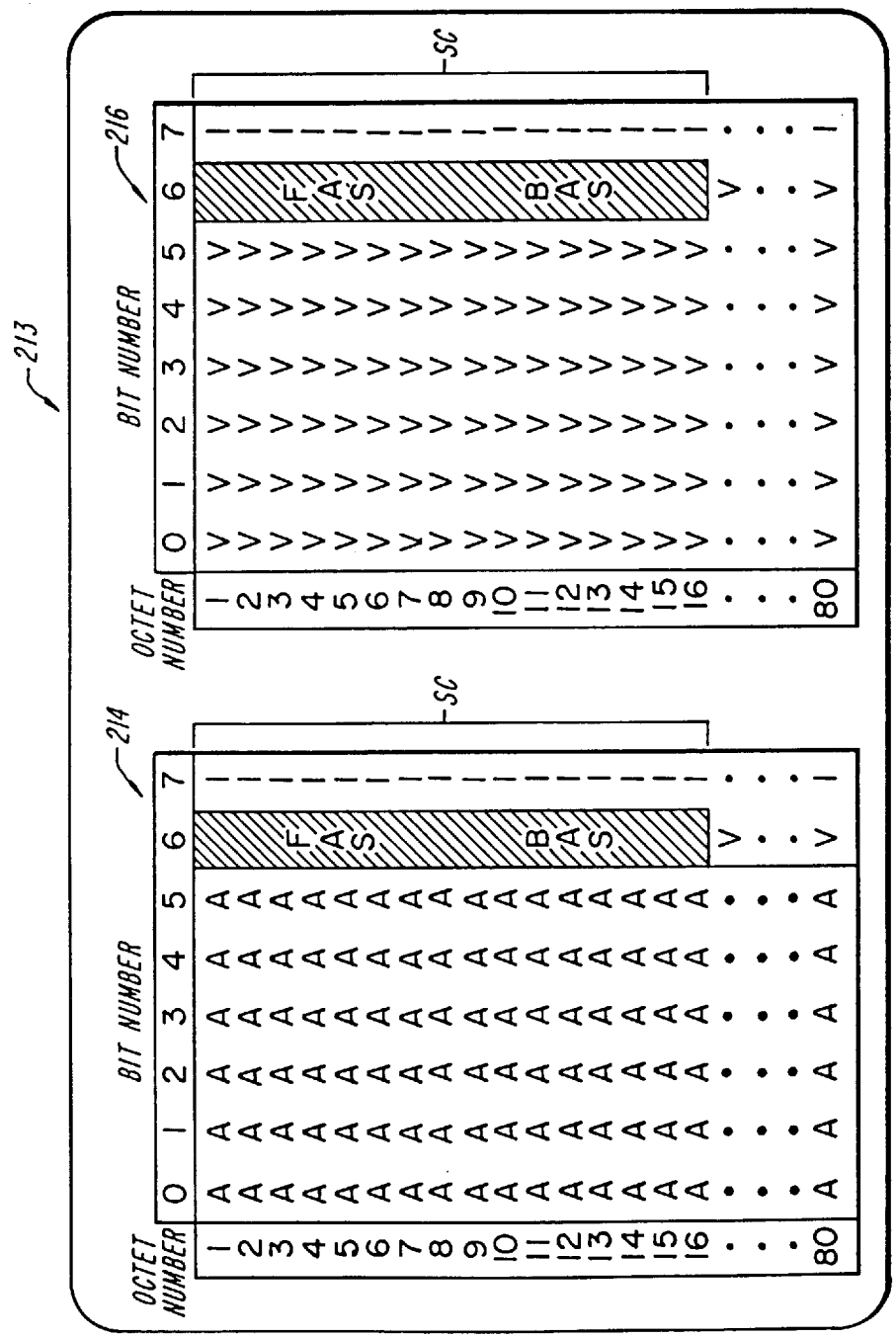
FIG. 5 depicts an ITU H.221 multichannel frame structure with G.711 audio coding.

FIG. 5 depicts an alternate H.221 connection structure 213 including an I-channel 214 and an A-channel 216, and employing G.711 audio coding on a restricted network. A restricted network is one that uses a robbed-bit signaling, often referred to as a Channel Associated Signaling (CAS), technique for passing signaling information, such as ring and answer information, to the receiving end of the connection. In this mode, bits are stolen from the 7th position in each channel 214 and 216. Since the 7th bit position can change due to network manipulation, the H.221 frame structure cannot depend on the integrity of this bit. To avoid bit errors, H.221 stuffs every 7th bit position with a binary "one" and does not use this bit. Doing so results in a loss of 8 Kbit/s for each channel 214 and 216. As a further result of the CAS technique, the SC occupies the 6th bit position on a restricted network. Unlike the G.728 standard, which requires only two bits for audio, G.711 requires six bits, thus limiting the available video bandwidth.

As mentioned above, there are three types of audio coding for video conferencing services. They are G.711, G.722 and G.728. G.711 defines the standard pulse code modulation (PCM) of voice frequencies, which is used when analog telephone signals are digitized for transmission through a digital network. G.711, shown in FIG. 5, provides audio transfer rates ranging from 48 Kbit/s to 56 Kbit/s, depending on whether the network is restricted. CODECs can also transmit in unframed audio only mode, which eliminates the H.221 frame structure and transmits the audio using all 64 Kbit/s of the connection.

G.722 produces a high bandwidth audio signal. Compared with G.711, which supports a bandwidth of 300 Hz to 3.5 KHz, G.722 audio supports a bandwidth of 50 Hz to 7 KHz.

However, G.722 audio requires the use of additional bits. As a result, video transfer rates only range from 48 Kbit/s to 56 Kbit/s, depending on whether the network is restricted.

G.728 produces audio quality comparable to a G.711 signal. However, as can be seen by comparing FIG. 4 to FIG. 5, it only uses 16 Kbit/s to accomplish this. The low bit rate is due to the intensive compression algorithms required to compress the audio signal. The tradeoff for the low bit rate is the requirement for additional processor power to encode and decode the audio information. The G.728 compression requires nearly the full capability of a 50 MHz DSP of the type employed by the invention to perform the required encoding and decoding. However, the low bit rate audio allows an additional 32 Kbit/s to 48 Kbit/s of bandwidth to be used for video information.

Figure 6:
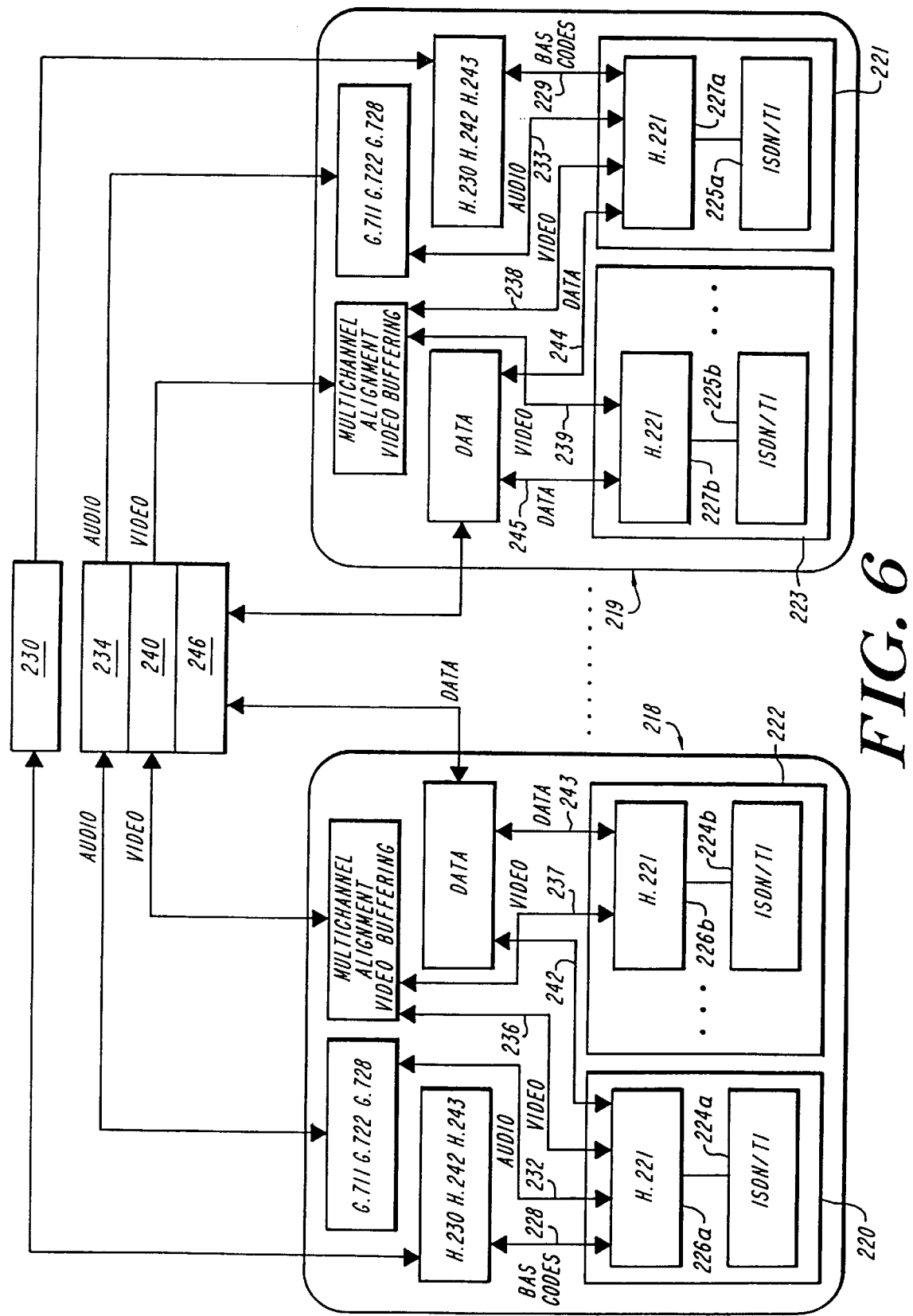
FIG. 6 is an information flow diagram illustrating the transfer of audio, video and data between conferees who are coupled together through the audio-video conferencing system of FIG. 1.

FIG. 6 is an information flow diagram illustrating audio, video and data being processed through the system 100 and coupled between conferees, in accord with the above discussed H.221 standard. As shown in FIG. 6, one or more CODECs (not shown) form connections 218 and 219 with the system 100. The connection includes I-channels 220 and 221 and one or more A-channels 222 and 223. Information is coupled into I-channel 220 by way of ISDN or T1 network interface 224a and into A-channel 222 by way of network interface 224b. Similarly, information is coupled into channels 221 and 223 by way of network interfaces 225a and 225b,respectively. The frame structures 226a, 226b, 227a and 227b of the incoming signals are processed and decomposed according to the H.221 standard.

The BAS codes 228 and 229 are split off from frames 226a, 226b, 227a and 227b and processed in accord with standards H.230, H.242 and H.243, which together govern frame synchronization, control and indication for multipoint audiovisual systems. The processed BAS codes are further processed in the MCU 102 by general conference control routines 230 to determine the operating parameters for the conference, including the audio, video and data transfer protocols that are able to be supported by the least powerful CODEC interfacing to the conference. The MCU 102 fabricates new BAS codes that are reincorporated into the frames 226a–227b in accord with the H.221 standard, prior to frames 226a–227b being rebroadcast onto the network by way of network interfaces 224a–225b.

The audio information 232 and 233 is split off and processed in accord with either G.711, G.722 or G.728, depending on the format of the audio transmitted by the CODEC. In the case of G.711 audio, which by definition is in Pulse Code Modulated (PCM) form, frame alignment is performed, and it is coupled to the audio mixer 234. In the case of G.722 and G.728 audio, the information is frame aligned, decompressed and converted into PCM form, before being coupled to the audio mixer 234. The audio mixer 234 combines the audio signals from all of the conferees. The mixed audio is then encoded in accord with either the G.711, G.722 or G.728 standard, and reincorporated into frames 226a and 227a in accord with H.221.

The video information 236–239 is multiframe and multichannel aligned and coupled to a video selector/broadcaster 240. According to a preferred embodiment, the selector/broadcaster 240 selects for broadcasting the video image of the conferee who is talking. The selected video is then reincorporated into frames 226a–227b in accord with H.221. Data information 242–245 is processed in the same fashion as the video information 236–239 and then coupled to the data selector/broadcaster 246. The data selector/broadcaster 246 determines which data will be rebroadcast and couples that data back for incorporation into frames 226a–227b in accord with H.221.

As discussed above, one feature of the present invention is that at least a subset of the DSPs included in the MCU 102 are configured for interchangeable use. In one aspect of the present invention, the MCU 102 distributes the DSP resources based on performing particular conferencing functions. Those functions can include, for example: G711 audio encoding (AE); G722 AE; G722 audio decoding (AD); G728 AE; G728 AD; H.221 frame monitoring and buffering (FMB); H.221 frame fabrication and transmitting (FFX); energy detection (ED); conference average magnitude (CAM), which detects how loud each of the conferees is talking; conference manager (CM), which detects which conferees should be heard; DTMF detection (DTMF), which detects when a digital telephone button has been depressed; call progress, which monitors outgoing calls for busy, reorder (fast busy), ringing and Special Services Information Tones (SSIT); and conference record, playback and annunciator features. A DSP cannot be configured to perform two of the above functions simultaneously. According to the invention, a DSP might perform one of the above functions for one or more conferee channels, depending on the complexity of the processing.

As can be seen from the above list there are two types of audio processor configurations. A DSP can be configured to perform either the decoding of the incoming audio information or the encoding of the outgoing audio information. More specifically, each AE configured DSP (AEP) and AD configured DSP (ADP) is arranged to process the audio in accord with one of the G.711, G.722 or G.728 standards. It should be noted that audio decoding is not required for G.711 because G.711 audio is considered to be in uncoded format (PCM) format.

The ADPs receive encoded audio information, decode it and transmit the decoded audio onto DSs segment of the H-MVIP bus so that it can be accessed by other DSPs. As would be expected, audio decoding is performed differently, depending on the audio encoding method. By way of example, decoded G.711 audio is in PCM format, which requires a single H-MVIP time slot for transmission; G.728 audio is decoded into a sixteen-bit linear format, which requires two H-MVIP time slots; and G.722 audio is decoded into two sixteen-bit linear numbers, which require four H-MVIP time slots.

The ADPs are also used to decode previously recorded conferences to be played back from disk. The host 174 of FIG. 3 transfers audio information from disk to the ADP by way of the dual port memory associated with the particular DSP. The ADP then transfers the data from the host onto DSs segment of the H-MVIP bus, where it is read by AEPs and processed for transmission to the network 116.

The AEPs read the decoded audio signals from DSs time slots, mix the decoded audio signals from each of the conferees and encode the results of the mixing according to the particular G-series standard. The AEPs then transmit the encoded audio either onto the DSs segment for use by other DSPs, or onto DSi segment for transmission to the network 116. The AEPs also transmit a node synchronization signal on a DSs time slot to synchronize the FMBs and the FFXs. The AEPs are also employed for recording to disk the audio portion of a video conference, for subsequent played back. An AEP performing a record function transfers the mixed audio data to the host 174 by way of its dual port memory.

The AEPs perform the encoding based, at least in part, on information received from ED, CM and CAM processors. The ED function reads available decoded audio, supplied by the ADPs, along with the G.711 audio, and performs an energy detect algorithm. The minimum detection level is −35 dBm. Upon finding a terminal broadcasting an audio signal having the required minimum energy, the ED processor passes a talk bit for that terminal to the CM function. The CM function reads all of the talk bits from the ED function and generates a list of the conferees who are talking. The CM function passes information to the CAM function, which determines how loud all of the conferees are talking. The CM/ED/CAM processor provides the talk information to the AEPs for use in mixing the audio signals from all of the conferees.

For additional information regarding ED, CM and CAM processing, reference should be made to U.S. Ser. No. 08/335,270 and U.S. Ser. No. 08/012,028, previously incorporated by reference.

The H.221 FMB and FFX processors perform the frame and multi-frame search and monitoring functions to synchronize to the conferee terminal. These processors also perform the video switching and recombination of the service channel, the audio, the video, and the data into octets for broadcasting to the conferees.

More specifically, the H.221 FMB processors perform frame and multiframe monitoring on all incoming video terminals. These processors are also responsible for transmitting received BAS codes, CRC error codes, and A-bit and E-bit changes to the host 174. According to one embodiment of the invention, to perform multichannel alignment and buffering, all of the channels of a terminal must be processed by the same DSP. The FMB processors couple aligned and buffered video and data onto the DSo segment of the H-MVIP bus, as specified by the host 174. The audio, video and data is available to all other DSPs, by way of the DSs component of the H-MVIP bus 204. The H.221 FFX processors read this information and frame it for transmission to the conferees.

The H.221 FFX processors combine the service channel, encoded audio, video and data into a frame for transmission to one or more conferee terminals. The host 174 specifies from which time slot on which H-MVIP bus component each FFX processor is to read the audio, video and data information. The host 174 also provides BAS commands and capabilities to the FFX processor. A video frame synchronization clock, supplied by an AEP, is used to ensure the FMB and the FFX write and read the correct information with respect to the H.221 frame structure.

When a conferee enters the system, the host 174 instructs an NI board to place the information from the conferee onto specific time slots on the DSi component of the H-MVIP bus 204. The host 174 then assigns an H.221 FMB processor to begin searching for frame alignment, and informs the FMB processor on which time slots to look for the information from the conferee. If frame alignment is not found within a configurable time (preferably ten seconds), the conferee is assumed to be using an audio only terminal, and the host 174 instructs the NI board to place the call on the appropriate H-MVIP rail. if framing is found, one of two sequences can occur.

If the incoming channel is an I-channel of a video terminal, the host 174 instructs an H.221 FFX to begin transmitting to the terminal by way of particular time slots on the DSo component of the 14-MVIP bus. The host 174 also instructs the NI board as to which time slots the output from the H.221 FFX can be found. After the capabilities exchange, terminal numbering, and any mode switches have occurred, the system 100 waits for the A-channels to be received.

If the incoming channel is an A-channel of a video terminal and the corresponding I-channel has previously been received, the host 174 has two options. First, if the DSP that is currently performing the FMB processing on the A-channel is the same DSP that processed the corresponding I-channel, the host 174 signals both the FMB that is processing the A-channel and the FFX that is servicing the terminal of this occurrence. Second, if the DSP that is currently performing the FMB processing on the A-channel is not the same DSP as processed the corresponding I-channel, the host 174 signals the NI board to redirect the A-channel to the DSP that processed the corresponding I-channel. The host 174 also signals the NI board where to direct the output of the FFX for the A-channel. This action is taken because, according to a preferred embodiment, to achieve multichannel alignment, the I-channel and subsequent A-channels should be processed by the same FMB processor. As previously discussed, the host 174 performs substantially all H-MVIP bus time slot allocation and coordination.

Each of the functions described above require differing amounts of processing power. By way of example, the number of each type of function which can be performed by a 50 MHz DSP of the type employed by the invention is provided in Table 2.

TABLE 2

| | |
|---|---|
| G.711 Audio Encode | 24/DSP |
| G.722 Audio Encode | 4/DSP |
| G.722 Audio Decode | 4/DSP |
| G.728 Audio Encode | 2/DSP |
| G.728 Audio Decode | 3/DSP |
| FMB | 8 terminals/DSP |
| FFX | 8 terminals/DSP |
| ED | 1 DSP/system |
| CM | 1 DSP/system |
| CAM | 1 DSP/system |
| Call Progress | 10 call/DSP |
| DTMF detection | 15/DSP |

Figure 7:
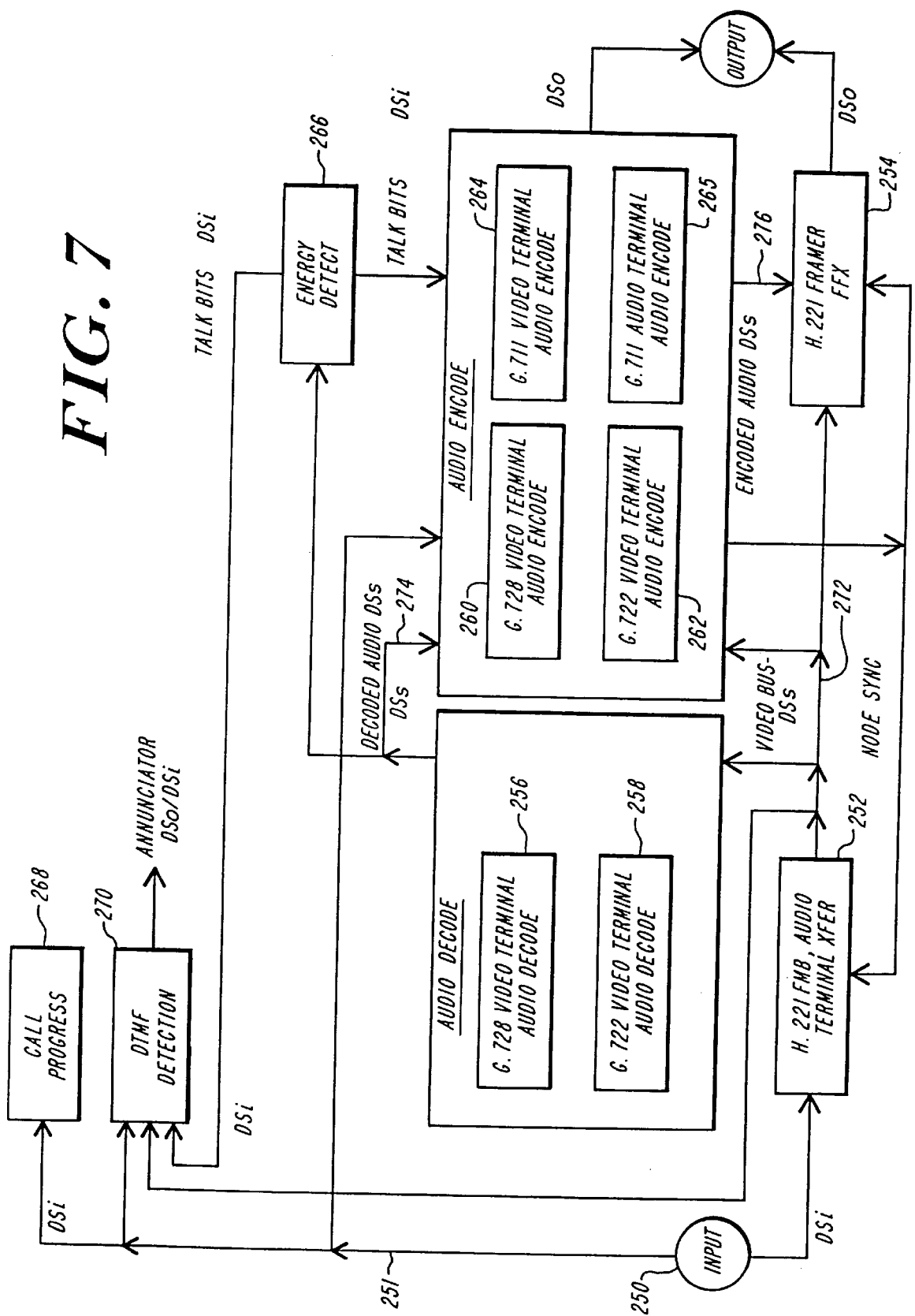
FIG. 7 is a schematic block diagram illustrating how the MCU of FIG. 1 distributes its DSP resources in accordance with the invention.

FIG. 7 is a schematic block diagram illustrative of how, according to one embodiment, the host 174 controls distribution of the processing requirements of servicing a typical audio-video conferencing channel by downloading different software modules to different DSPs. As discussed above, DSP processing is distributed based on performing particular functions, such as those listed in Table 2, not based on servicing all of the needs of a particular communication channel. For illustrative purposes, FIG. 7 shows both G.722 and G.728 encoders and decoders, along with G.711 encoders. However, in preferred operation, the MCU 102 only operates under a single G-standard for any particular conference.

Assuming a dial out scenario, the host 174 allocates the required DSP resources prior to establishing a connection with conferee terminals. As shown in FIG. 7, the host 174 can allocate DSPs for a plurality of functions such as, a DSP 252 for FMB processes, a DSP 254 for H.221 FFX processing, a DSP 256 for G.728 AD, a DSP 258 for G.722 AD, a DSP 260 for G.728 AE, a DSP 262 for G.722 AE; a DSP 264 for G.711 video terminal AE, and a DSP 265 for G.711 audio terminal AE. The host 174 can also allocate a DSPs 266 for ED, CM and CAM processing, a DSP 268 for call progress monitoring, and a DSP 270 for DTMF detection.

The CODEC of the conferee terminal and the MCU 102 establish a connection by way of the network 116. As shown at 250, a NI board 196–202 couples the information from the CODEC to the DSi component 251 of the H-MVIP bus. The H.221 FMB DSP 252 reads the BAS codes, FAS and CRC error codes from the DSi component and couples them back to the host 174 by way of the ISA bus 206 of FIG. 3. The FMB DSP 252 also buffers and synchronizes the remainder of the information on the input channel and couples it to rails 0–2 of the DSs component of the H-MVIP bus. A portion of the DSs component of the H-MVIP bus is an internal bus, referred to as the Video Bus 272.

Assuming G.728 audio encoding, DSP 256 reads the buffered encoded audio information from the Video Bus 272. The DSP 256 then decodes the audio information and couples the decoded audio onto another portion of the DSs component, the Audio Bus 274. The DSPs 266 and 260 read the decoded audio from the Audio Bus 274. DSPs 266 process the decoded audio to determine who is talking, how loud each conferee is talking and which conferees should be heard. DSPs 266 couples this information to DSP 260 by way of the DSi component of the H-MVIP bus. DSP 260 mixes the audio information received from all of the conferees in accord with information received from DSP 266, encodes the mixed audio in accord with the G.728 standard and couples the mixed encoded audio onto another internal bus 276, which is comprised of another portion of the DSs component of the H-MVIP bus. The H.221 FFX DSP 254 reads the encoded mixed audio from the bus 276 and the buffered synchronized video from the Video Bus 272, fabricates the FAS and BAS codes in accord with instructions from the host 174, and frames that information in accord with the H.221 standard. The DSP 254 then couples the framed information onto the DSo component of the H-MVIP bus for retransmission by a NI board 196–202.

In the case where the conferee terminal is a telephone that provides G.711 audio (standard audio), no audio decoders, FMB processors or FFX processors are required. Consequently, the G.711 ADP 265 reads the audio information directly from the DSi component of the H-MVIP bus.

As can be seen for FIG. 7, and as previously discussed, according to a preferred embodiment of the invention, the host 174 allocates each required conferencing function to a particular DSP. By allocating each DSP to a particular function, such as those listed in Table 2, the host 174 makes the most efficient use of the processing capabilities and avoids duplicative electronic hardware. The invention also simplifies the design of the electronics by rendering the DSP board assemblies 180–194 identical. It also simplifies the software control modules, since each module can be dedicated to performing a specific one of the functions listed in Table 2. Further, the invention simplifies the time division multiplexing of the H-MVIP bus, since any DSP can read from and write to any time slot. Thus, it is easier to locate an available time slot, and freeing a time slot is achieved by simply clearing its "in use" field.

According to a preferred embodiment of the invention, the host 174 controls the allocation of at least a subset of the DSPs and can dynamically adapt the allocation of particular DSPs to perform particular ones of the tasks listed in Table 2. This feature of the invention can be illustrated with further reference to FIG. 7. Assuming, for this example, that one of the NI boards 196–202 has received a call from network 116 of FIG. 1, the NI board signals the host 174 (by way of an interrupt) that a communication has been received. The host 174 responds by examining status information, which it maintains in memory 175, to determine if there are any DSPs available to perform H.221 FMB operations. As indicated in Table 2, each DSP is capable of servicing eight terminals for FMB processing. The host 174, by examining the stored status information, can recognize that DSP 252, for example, is allocated for FMB processing. Having located DSP 252, the host 174 determines whether DSP 252 is already servicing its limit of eight terminals. If not, the host 174 adjusts the appropriate status information in memory 175 and assigns DSP 252 to perform the H.221 processing for the incoming call. The host 174 signals the NI board as to which time slot on the DSi component of the H-MVIP bus 204 to place the information from the network 116, and also informs DSP 252 as to which time slot to find the information from the NI board.

If each of the DSPs that are allocated for performing FMB processing is already assigned to service eight terminals, the host 174 cycles through stored DSP configuration tables to locate an inactive DSP. When the host 174 locates an inactive DSP, it stores a status in memory 175 to indicate the type of function to which the DSP is being assigned, for example, indicating that the DSP is to perform FMB processing. The host 174 then down loads to the DSP's dual port memory software from hard disk 166 that programs the generic DSP to be configured as an H.221 FMB processor.

To facilitate the process of identifying available DSPs, the host 174 tracks information, by way of status tables in memory 175, such as, which DSPs are, which DSPs are assigned to perform each of the functions of Table 2, and the number of available channels on each DSP that is assigned to a particular function. If the host 174 cannot locate an available DSP for a particular function, then it examines the status tables to determine if an allocated DSP is indicating that its number of available channels is equal to the maximum number of channels that it can service. If this is the case, it means that the DSP, although allocated for a particular function, is nevertheless, idle. If the host 174 locates such an idle DSP, it reloads it with the software required to dedicate the DSP to its new function and updates the appropriate status tables in memory 175. If the host 174 cannot locate any DSPs whatsoever, an error occurs and according to a preferred embodiment, the call from the network 116 is rejected.

As those skilled in the art will appreciate, DSPs for all of the tasks illustrated in FIG. 7 can be allocated in a similar fashion to that described above for the H.221 FMB processing. Additionally, some of the DSPs can be permanently allocated ("nailed up") to perform particular functions.

Figure 8:
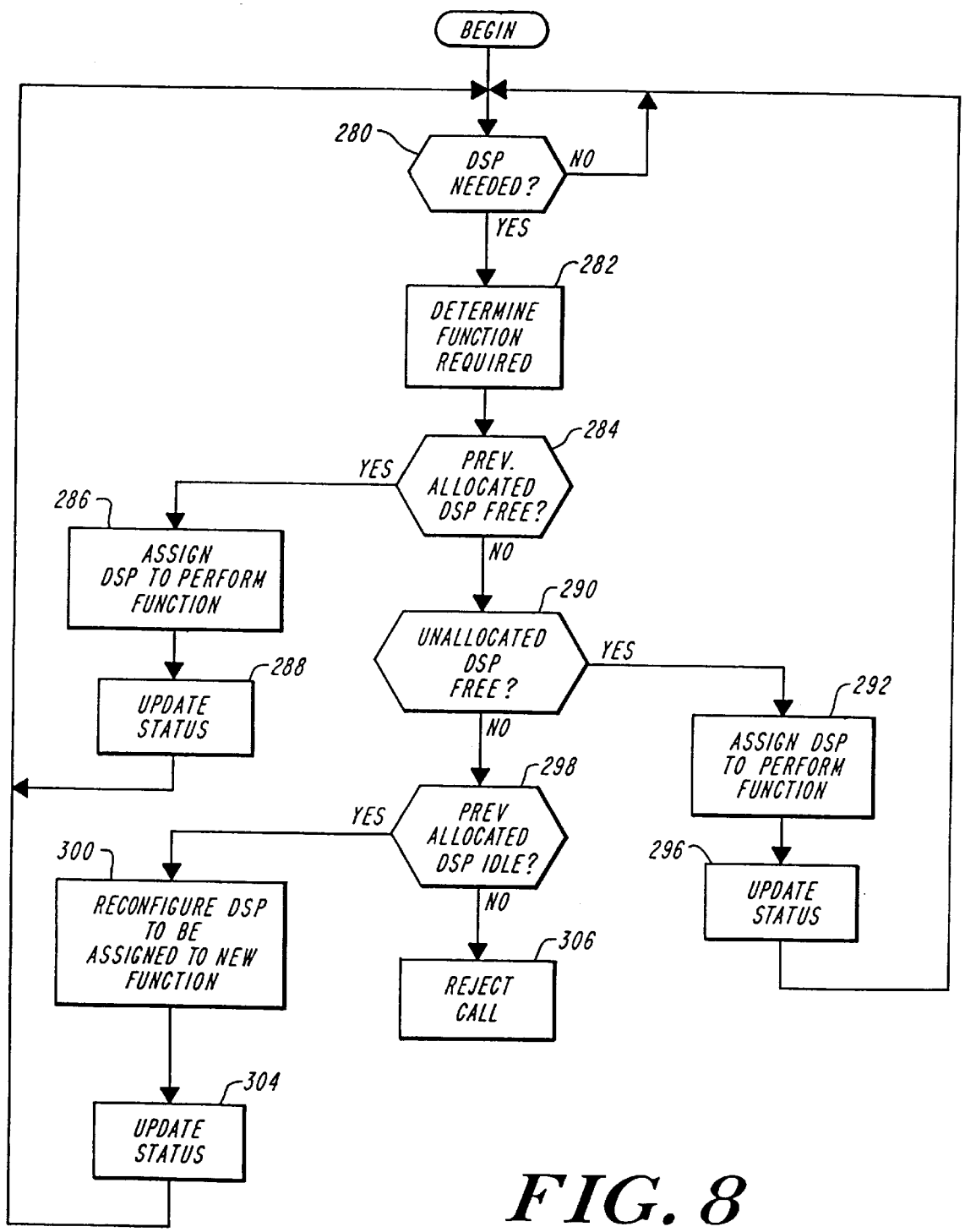
FIG. 8 is a flowchart illustrating the process by which the MCU of FIG. 1 dynamically adapts the allocation of its DSP resources in accordance with the invention.

FIG. 8 provides a simplified flowchart illustrative of how the host 174 can dynamically adapt the allocation of DSP resources to realize one or more of the functions listed in Table 2. As illustrated by decision block 280, the host 174 determines if a particular conferencing function requires processing by a DSP. If so, the host 174 determines in block 282 which one of the functions listed in Table 2 is required to be performed. Once the particular function is identified, the host 174 examines stored status information in block 284 to determine if any DSPs which have been previously allocated to perform the particular function are available. If one is available, the host 174 in block 286 assigns the DSP to the particular function by down loading the appropriate software and in block 288 updates the stored status information.

If no previously allocated DSP is available, the host 174 in block 290 examines stored status information to determine if there are any unallocated DSPs available. If so, the host 174 in block 292 downloads software, by way of the DSP's dual port memory, to assign that DSP to the particular function, in block 296 updates the stored status information.

If no unallocated DSP is available, the host 174 in block 298 examines stored status information to determine whether any DSPs that were previously allocated for other functions show statuses that indicate that the number of available channels on the DSP is equal to the maximum number of channels which the DSP is capable of servicing for the assigned function. If this is the case, the host 174 determines that the DSP, although assigned, is nevertheless, completely idle. In response, the host 174 in block 300 reconfigures the DSP by downloading software to configure the DSP to perform the new function, and in block 304 updates the stored status information.

If the host 174 cannot locate any available DSPs, it generates an error in block 306 and rejects the call from the network 116.

Other embodiments of the above described multipoint audio-video conferencing system having distributed and/or dynamically updatable processor allocation will be obvious to those skilled in the art. Thus, additions, subtractions, deletions and other modifications of the preferred described embodiments are within the scope of the claims. In particular, the steps by which the host 174 tracks and identifies available DSPs can be performed in a plurality of orders. Additionally, the actual programming of the host 174 which controls system operation in the manner and with the system elements described, and provides the distributed and/or dynamically adaptive allocation of the DSPs and provides the particular functions listed in Table 2 can be performed in a number of ways and employs skills and techniques conventional to those skilled in the art of programming.

Having described the invention, what is claimed as new and secured by Letters Patent is:

1. A processor unit for a multipoint audio-video conferencing system, said processor unit comprising:
   a host processor for controlling operation of said audio-video conferencing system, wherein said operation includes performing a plurality of functions associated with servicing each of a plurality of communications connections, each of said connections being between a conferee terminal and the audio-video conferencing system; and
   a plurality of digital signal processors in communication with each other over a first bus and in communication with and controlled by said host processor over a second bus,
   wherein each digital signal processor includes associated configuration means for adaptively configuring each selected digital signal processor to perform processing required by a selected one of said functions associated with servicing said plurality of communications connections, and
   wherein said processing required by said plurality of functions associated with servicing said plurality of communications connections is distributed among said plurality of digital signal processors.

2. A processor unit for a multipoint audio-video conferencing system according to claim 1, wherein said configuration means comprises a first digital storage means for storing software for adaptively configuring said associated digital signal processor to perform said processing required by said selected one of said plurality of functions.

3. A processor unit for a mulitpoint audio-video conferencing system according to claim 2 further comprising second digital storage means for storing a plurality of software routines, wherein said host processor includes digital signal processor control means for adaptively configuring said associated digital signal processor by downloading one or more of said software routines from said second digital storage means to said first digital storage means of said selected digital signal processor.

4. A processor unit for a multipoint audio-video conferencing system according to claim 1, wherein said host processor includes digital signal processor control means for adaptively configuring any of said plurality of digital signal processors to perform said processing required by said selected one of said plurality of functions.

5. A processor unit for a multipoint audio-video conferencing system according to claim 1, wherein said host processor includes digital signal processor control means for adaptively configuring any of said plurality of digital signal processors, not already dedicated to performing processing required by one of said plurality of functions, to perform said processing required by any selected one of said plurality of functions.

6. A processor unit for a multipoint audio-video conferencing system according to claim 1, wherein said host processor includes digital signal processor control means for reconfiguring any of said plurality of digital signal processors, previously dedicated to performing processing required by one of said plurality of functions, to perform said processing required by any selected one of said plurality of functions.

7. A processor unit for a multipoint audio-video conferencing system according to claim 1, wherein said host processor includes a first digital storage means for storing status information including a first status indicative of whether each of said digital signal processors is configured to perform processing required by any of said plurality of functions and if so, which processing said digital signal processor is to perform.

8. A processor unit for a multipoint audio-video conferencing system according to claim 7, wherein said host processor includes means for identifying, from said first status, ones of said digital signal processors which are not configured to perform processing required by any of said plurality of functions.

9. A processor unit for a multipoint audio-video conferencing system according to claim 7, wherein each of said plurality of digital signal processors has an associated maximum number of said communications connections for which said digital signal processor can provide said processing required by any one of said plurality of functions, and wherein said status information includes a second status indicative of the number of said communications connections for which each of said digital signal processors is available to perform processing.

10. A processor unit for a multipoint audio-video conferencing system according to claim 9, wherein said host processor includes means for identifying, from said second status, ones of said plurality of digital signal processors which are configured to perform processing required by ones of said functions and which are available to perform processing for additional communications connections.

11. A processor unit for a multipoint audio-video conferencing system according to claim 9, wherein said host processor includes means for identifying, by comparing said maximum number with said second status, ones of said digital signal processors which are configured to perform processing required by one of said functions, but which are not performing processing for any of said communications connections.

12. A processor unit for a multipoint audio-video conferencing system according to claim 11, wherein said host processor includes means for reconfiguring any of said digital signal processors which are configured to perform processing required by one of said functions, but which are not performing processing for any of said communications connections, to perform processing required by another selected one of said functions.

13. A processor unit for a multipoint audio-video conferencing system according to claim 1, wherein said plurality of functions comprise at least two of G.711 audio encoding, G.722 audio encoding, G.722 audio decoding, G.728 audio encoding, G.728 audio decoding, frame monitoring and buffering, framing, talker energy detection, conference manager detection, conference average magnitude detection, call progress detection, and DTMF detection.

14. A processor unit for a multipoint audio-video conferencing system according to claim 1, wherein said first bus is a time division multiplexed bus having a plurality of time slots, and said processing unit further comprises network interface means for coupling information from a selected conferee terminal onto said first bus in a first plurality of time slots on said first bus, and each of said plurality of digital signal processors includes means for reading said information from said first plurality of time slots and means for coupling at least one of unprocessed and processed versions of said information onto said first bus in a second plurality of time slots.

15. A processor unit for a multipoint audio-video conferencing system according to claim 14, wherein said host processor includes means for dynamically assigning said first plurality of time slots to said network interface means and means for dynamically assigning said second plurality of time slots to said digital signal processors.

16. A processor unit for a multipoint audio-video conferencing system according to claim 14, wherein said network interface means includes a plurality of network interface processors; and said host processor includes means for dynamically assigning which of said network interface processors is to couple said information from said selected conferee terminal to said first bus, means for assigning said first and said second pluralities of time slots, and storage means for storing status information indicative of which time slots are assigned for coupling information from said selected conferee terminal to said first bus, and which time slots are assigned to said digital signal processors for coupling at least one of unprocessed and processed versions of said information.

17. A processor unit for a multipoint audio-video conferencing system according to claim 16, wherein said host processor includes storage means for storing status information indicative of which of said network interface processors is assigned to couple said information from said selected conferee terminal.

18. A processor unit for a multipoint audio-video conferencing system according to claim 17, wherein said network interface processors each include means for coupling information from said first bus to said selected conferee terminal.

19. A multipoint audio-video conferencing system comprising:

a multipoint control unit including means for forming audio-video communications connections between a plurality of conferee terminals and said conferencing system, and means for controlling said communications connections to establish an audio-video conference between said plurality of conferee terminals; and an operator workstation, in communication with said conferee terminals, and including means for monitoring and controlling selected operational parameters associated with said audio-video communications connections, wherein said multipoint control unit further comprises, a host processor for controlling performance of a plurality of functions associated with servicing said communications connections between said conferee terminals and said audio-video conferencing system; and a plurality of digital signal processors in communication with each other over a first bus and in communication with and controlled by said host processor over a second bus, wherein each digital signal processor includes associated configuration means for adaptively configuring each selected digital signal processor to perform processing required by a selected one of said functions associated with servicing said plurality of communications connections, and wherein said processing required by said plurality of functions associated with servicing said plurality of communications connections is distributed among said plurality of digital signal processors.

20. A multipoint audio-video conferencing system according to claim 19, wherein said configuration means comprises a first digital storage means for storing software for adaptively configuring said associated digital signal processor to perform said processing required by said selected one of said plurality of functions.

21. A multipoint audio-video conferencing system according to claim 20 wherein said multipoint control unit further comprises second digital storage means for storing a plurality of software routines, and wherein said host processor includes digital signal processor control means for adaptively configuring said associated digital signal processor by downloading one or more of said software routines from said second digital storage means to said first digital storage means of said selected digital signal processor.

22. A multipoint audio-video conferencing system according to claim 19, wherein said host processor includes digital signal processor control means for adaptively configuring any of said plurality of digital signal processors to perform said processing required by said selected one of said plurality of functions.

23. A multipoint audio-video conferencing system according to claim 19, wherein said host processor includes digital signal processor control means for adaptively configuring any of said plurality of digital signal processors, not already dedicated to performing processing required by one of said plurality of functions, to perform said processing required by any selected one of said plurality of functions.

24. A multipoint audio-video conferencing system according to claim 19, wherein said host processor includes digital signal processor control means for reconfiguring any of said plurality of digital signal processors, previously dedicated to performing processing required by one of said plurality of functions, to perform said processing required by any selected one of said plurality of functions.

25. A multipoint audio-video conferencing system according to claim 19, wherein said host processor includes a first digital storage means for storing status information including a first status indicative of whether each of said digital signal processors is configured to perform processing required by any of said plurality of functions and if so, which processing said digital signal processor is to perform.

26. A multipoint audio-video conferencing system according to claim 25, wherein said host processor includes means for identifying, from said first status, ones of said digital signal processors which are not configured to perform processing required by any of said plurality of functions.

27. A multipoint audio-video conferencing system according claim 25, wherein each of said plurality of digital signal processors has an associated maximum number of said communications connections for which said digital signal processor can provide said processing required by any one of said plurality of functions, and wherein said status information includes a second status indicative of the number of said communications connections for which each of said digital signal processors is available to perform processing.

28. A multipoint audio-video conferencing system according to claim 27, wherein said host processor includes means for identifying, from said second status, ones of said plurality of digital signal processors which are configured to perform processing required by ones of said functions and which are available to perform processing for additional communications connections.

29. A multipoint audio-video conferencing system according to claim 28, wherein said host processor includes means for identifying, by comparing said maximum number with said second status, ones of said digital signal processors which are configured to perform processing required by one of said functions, but which are not performing processing for any of said communications connections.

30. A multipoint audio-video conferencing system according to claim 29, wherein said host processor includes means for reconfiguring any of said digital signal processors which are configured to perform processing required by one of said functions, but which are not performing processing for any of said communications connections, to perform processing required by another selected one of said functions.

31. A multipoint audio-video conferencing system according to claim 19, wherein said plurality of functions comprise at least two of G.711 audio encoding, G.722 audio encoding, G.722 audio decoding, G.728 audio encoding, G.728 audio decoding, frame monitoring and buffering, framing, talker energy detection, conference manager detection, conference average magnitude detection, call progress detection, and DTMF detection.

32. A multipoint audio-video conferencing system according to claim 19, wherein said first bus is a time division multiplexed bus having a plurality of time slots, and said multipoint control unit further comprises network interface means for coupling information from a selected conferee terminal onto said first bus in a first plurality of time slots on said first bus, and each of said plurality of digital signal processors includes means for reading said information from said first plurality of time slots and means for coupling at least one of unprocessed and processed versions of said information onto said first bus in a second plurality of time slots.

33. A multipoint audio-video conferencing system according to claim 32, wherein said host processor includes means for dynamically assigning said first plurality of time slots to said network interface means and means for dynamically assigning said second plurality of time slots to said digital signal processors.

34. A multipoint audio-video conferencing system according to claim 32, wherein said network interface means includes a plurality of network interface processors; and
said host processor includes means for dynamically assigning which of said network interface processors is to couple said information from said selected conferee terminal to said first bus, means for assigning said first and said second pluralities of time slots, and storage means for storing status information indicative of which time slots are assigned for coupling information from said selected conferee terminal to said first bus, and which time slots are assigned to said digital signal processors for coupling at least one of unprocessed and processed versions of said information.

35. A multipoint audio-video conferencing system according to claim 34, wherein said host processor incudes storage means for storing status information indicative of which of said network interface processors is assigned to couple said information from said selected conferee terminal.

36. A multipoint audio-video conferencing system according to claim 35, wherein said network interface processors each include means for coupling information from said first bus to said selected conferee terminal.

37. A method for distributing processing resources in an audio-video conferencing system including a multipoint control unit having a host processor for controlling operation of said audio-video conferencing system, wherein said operation includes performing a plurality of functions associated with servicing communications connections between a plurality of conferee terminals and said audio-video conferencing system, and a plurality of digital signal processors in communication with each other over a first bus, and in communication with and controlled by said host processor over a second bus, the method comprising the steps of:
adaptively configuring each selected digital signal processor to perform processing required by a selected one of said functions associated with servicing said plurality of communications connections; and
distributing said processing required by said plurality of functions associated with servicing said plurality of communications connections among said plurality of digital signal processors.

38. A method for distributing processing resources in an audio-video conferencing system according to claim 37 said step of adaptively configuring further comprises the step of allocating a first digital storage associated with said selected digital signal processor for storing software for adaptively configuring said associated digital signal processor to perform said processing required by said selected one of said functions.

39. A method for distributing processing resources in an audio-video conferencing system according to claim 38 comprising the further step of storing in a second digital storage in said host processor software routines and said step of adaptively configuring further comprises downloading one or more of said software routines from said second digital storage to said first digital storage.

40. A method for distributing processing resources in an audio-video conferencing system according to claim 37, wherein said step of adaptively configuring further comprises adaptively configuring any of said plurality of digital signal processors to perform said processing required by said selected one of said selected one of said plurality of functions.

41. A method for distributing processing resources in an audio-video conferencing system according to claim 37, wherein said step of adaptively configuring further comprises adaptively configuring any of said plurality of digital signal processors, not already dedicated to performing processing required by one of said plurality of functions, to perform said processing required by any selected one of said plurality of functions.

42. A method for distributing processing resources in an audio-video conferencing system according to claim 37, wherein said step of adaptively configuring further comprises reconfiguring any of said plurality of digital signal processors, previously dedicated to performing processing required by one of said plurality of functions, to perform said processing required by any selected one of said plurality of functions.

43. A method for distributing processing resources in an audio-video conferencing system according to claim 37 comprising the further step of storing in said host processor status information including a first status indicative of whether each of said digital signal processors is configured to perform processing required by any of said plurality of functions and if so, which processing said digital signal processor is to perform.

44. A method for distributing processing resources in an audio-video conferencing system according to claim 43 comprising the further step of identifying, from said first status, ones of said digital signal processors which are not configured to perform processing required by any of said plurality of functions.

45. A method for distributing processing resources in an audio-video conferencing system according to claim 43, wherein each of said plurality of digital signal processors has an associated maximum number of said communications connections for which said digital signal processor can provide said processing required by any one of said plurality of functions, and said method comprises the further step of storing in said host processor a second status indicative of the number of said communications connections for which each of said digital signal processors is available to perform processing.

46. A method for distributing processing resources in an audio-video conferencing system according to claim 45 comprising the further step of identifying, from said second status, ones of said plurality of digital signal processors which are configured to perform processing required by ones of said functions and which are available to perform processing for additional communications connections.

47. A method for distributing processing resources in an audio-video conferencing system according to claim 45 comprising the further step of identifying, by comparing said maximum number with said second status, ones of said digital signal processors which are configured to perform processing required by one of said functions, but which are not performing processing for any of said communications connections.

48. A method for distributing processing resources in an audio-video conferencing system according to claim 47 comprising the further step of reconfiguring any of said digital signal processors which are configured to perform processing required by one of said functions, but which are not performing processing for any of said communications connections, to perform processing required by another selected one of said functions.

49. A method for distributing processing resources in an audio-video conferencing system according to claim 37, wherein said plurality of functions comprise at least two of G.711 audio encoding, G.722 audio encoding, G.722 audio decoding, G.728 audio encoding, G.728 audio decoding, frame monitoring and buffering, framing, talker energy detection, conference manager detection, conference average magnitude detection, call progress detection, and DTMF detection.

50. A method for distributing processing resources in an audio-video conferencing system according to claim 37, wherein said first bus is a time division multiplexed bus having a plurality of time slots, said method further comprises the steps of coupling information from a selected conferee terminal onto said first bus in a first plurality of time slots on said first bus, reading said information into said digital signal processors from said first plurality of time slots, and coupling at least one of unprocessed and processed versions of said information onto said first bus in a second plurality of time slots.

51. A method for distributing processing resources in an audio-video conferencing system according to claim 50 comprising the further step of dynamically controlling assignment of said first plurality of time slots to said network interface means and dynamically controlling assignment of said second plurality of time slots to said digital signal processors.

52. A method for distributing processing resources in an audio-video conferencing system according to claim 51, wherein said network interface means includes a plurality of network interface processors and said method comprises the further steps of, dynamically controlling assignment of which of said network interface processors is to couple said information from said selected conferee terminal to said first bus, dynamically controlling assignment of said first and said second pluralities of time slots, and storing status information indicative of which time slots are assigned for coupling information from said selected conferee terminal to said first bus, and which time slots are assigned to said digital signal processors for coupling at least one of unprocessed and processed versions of said information.

53. A method for distributing processing resources in an audio-video conferencing system according to claim 52 comprising the further step of storing status information indicative of which of said network interface processors is assigned to couple said information from said selected conferee terminal.

54. A method for distributing processing resources in an audio-video conferencing system according to claim 53 comprising the further step of coupling information from said first bus to said selected conferee terminal.

55. A method for distributing processing resources in an audio-video conferencing system including a multipoint control unit having a host processor for controlling operation of said audio-video conferencing system, wherein said operation includes performing a plurality of functions associated with servicing communications connections between a plurality of conferee terminals and said audio-video conferencing system, and a plurality of digital signal processors in communication with each other over a first bus, and in communication with and controlled by said host processor over a second bus, the method comprising the steps of:

detecting whether one of said plurality of functions associated with servicing one of said communications connections is required to be performed;

select an available one of said plurality of digital signal processors; and configure said available one of said digital signal processors to perform processing required by said one of said plurality of functions.

56. A method for distributing processing resources in an audio-video conferencing system according to claim 55, wherein said step of detecting further comprises determining which one of said plurality of functions is required to be performed.

57. A method for distributing processing resources in an audio-video conferencing system according to claim 56, wherein said step of selecting further comprises examining a first status maintained in a digital storage of said host processor to determine if any of said digital signal processors are allocated for performing processing required by said one of said plurality of functions.

58. A method for distributing processing resources in an audio-video conferencing system according to claim 57, wherein said step of selecting further comprises examining a second status maintained in said digital storage to determine if any of said digital signal processors which are allocated for performing said processing required by said one of said plurality of functions is additionally capable of performing said processing required by said one of said plurality of functions for said one of said communications connections.

59. A method for distributing processing resources in an audio-video conferencing system according to claim 55, wherein said step of selecting further comprises examining a status maintained in a digital storage of said host processor to determine if any of said digital signal processors are not configured for performing processing required by any of said functions.

60. A method for distributing processing resources in an audio-video conferencing system according to claim 55, wherein said step of selecting further comprises examining a status maintained in a digital storage of said host processor to determine if any of said digital signal processors are configured for performing a selected one of said functions, but are idle.

61. A method for distributing processing resources in an audio-video conferencing system according to claim 55, wherein said step of configuring further comprises downloading from a first digital storage in said host processor one or more software routines to configure digital signal processor to perform said processing required by said one of said plurality of functions.

62. A method for distributing processing resources in an audio-video conferencing system according to claim 61, wherein said step of configuring further comprises updating a status maintained in a second digital storage of said host processor to reflect configuration of said digital signal processor to perform said processing required by said one of said plurality of functions.

* * * * *